United States Patent
Qureshi et al.

(10) Patent No.: US 9,133,295 B2
(45) Date of Patent: Sep. 15, 2015

(54) PREPARATION OF PHENOL-FORMALDEHYDE RESIN BEADS USING SUSPENSION OR EMULSION POLYMERIZATION

(71) Applicant: Georgia-Pacific Chemicals LLC, Atlanta, GA (US)

(72) Inventors: Shahid P. Qureshi, Duluth, GA (US); Xing Dong, Decatur, GA (US); Charles C. Chan, Snellville, GA (US); Joseph Frank Ludvik, Midlothian, VA (US)

(73) Assignee: Georgia-Pacific Chemicals LLC, Atlanta, GA (US)

( * ) Notice: Subject to any disclaimer, the term of this patent is extended or adjusted under 35 U.S.C. 154(b) by 164 days.

(21) Appl. No.: 14/092,267

(22) Filed: Nov. 27, 2013

(65) Prior Publication Data

US 2014/0148560 A1    May 29, 2014

Related U.S. Application Data

(60) Provisional application No. 61/731,113, filed on Nov. 29, 2012.

(51) Int. Cl.
| | |
|---|---|
| *C08G 8/10* | (2006.01) |
| *C08G 8/32* | (2006.01) |
| *C08G 8/22* | (2006.01) |
| *C08G 85/00* | (2006.01) |

(52) U.S. Cl.
CPC .. *C08G 8/32* (2013.01); *C08G 8/10* (2013.01); *C08G 8/22* (2013.01); *C08G 85/004* (2013.01)

(58) Field of Classification Search
None
See application file for complete search history.

(56) References Cited

U.S. PATENT DOCUMENTS

| | | | | |
|---|---|---|---|---|
| 3,943,080 | A | * | 3/1976 | Wismer et al. ................. 523/223 |
| 4,873,218 | A | * | 10/1989 | Pekala ........................... 502/418 |
| 5,508,341 | A | * | 4/1996 | Mayer et al. .................. 524/596 |
| 7,919,183 | B2 | | 4/2011 | McDaniel et al. |
| 8,058,213 | B2 | | 11/2011 | Rediger et al. |
| 8,293,818 | B2 | | 10/2012 | Costantino et al. |
| 2011/0028599 | A1 | | 2/2011 | Costantino et al. |

* cited by examiner

*Primary Examiner* — Robert C Boyle
(74) *Attorney, Agent, or Firm* — Ram W. Sabnis

(57) ABSTRACT

Methods for making polymer particles in gel form via an emulsion and/or suspension polymerization are provided. In at least one specific embodiment, the method can include reacting a first reaction mixture comprising a phenolic monomer, an aldehyde monomer, and a first catalyst to produce a prepolymer. The method can also include combining the prepolymer with a carrier fluid and a second catalyst to produce a second reaction mixture. The second catalyst can include a dicarboxylic acid, an anhydride, a dihydroxybenzene, or any mixture thereof. The method can also include polymerizing the prepolymer to form polymer particles in gel form.

20 Claims, No Drawings

PREPARATION OF PHENOL-FORMALDEHYDE RESIN BEADS USING SUSPENSION OR EMULSION POLYMERIZATION

CROSS-REFERENCE TO RELATED APPLICATION

This application claims priority to U.S. Provisional patent application having Ser. No. 61/731,113, filed Nov. 29, 2012, which is incorporated by reference herein.

BACKGROUND

1. Field

Embodiments described herein generally relate to methods for making resin or polymer particles in gel form. More particularly, such embodiments relate to methods for making phenol-formaldehyde resin or polymer particles in gel form that can be further processed into aerogel, xerogel, and/or cryogel particles.

2. Description of the Related Art

Carbon materials such as carbon aerogels, xerogels, and cryogels have been used in a variety of products, such as supercapacitors, to improve their properties. Such carbon materials are typically produced by converting polymer gels into the desired carbon materials. For example, resorcinol and formaldehyde can be used to make precursor solutions (e.g., a "sol," which is a solution or a colloidal dispersion of particles in a liquid) which can then be processed into large monolithic polymer gels or "sol-gels" by polymerization.

Monolithic polymer gels, however, are difficult and expensive to produce and convert into aerogels, xerogels, or cryogels. Due to the monolith's large size and low thermal conductivity a significant amount of energy, time, and specialized equipment is required to polymerize the monomer components that makes up the monolith structure. Physical differences in the monolithic polymer are also formed which can negatively impact the aerogel, xerogel, or cryogel's performance produced. Such physical differences are often formed due to the uneven heating of the monolithic polymer gel as heat is transferred from the outside to the inside thereof. Furthermore, the large monolithic polymer gel requires physical grinding to reduce its monolithic structure into polymer particles in gel form that can then be processed into the aerogel, xerogel, or cryogel. This additional step is also labor, capital, and time intensive.

There is a need, therefore, for improved methods for making polymer particles in gel form.

SUMMARY

Methods for making polymer particles in gel form via an emulsion and/or suspension polymerization are provided. In at least one specific embodiment, the method can include reacting a first reaction mixture comprising a phenolic monomer, an aldehyde monomer, and a first catalyst to produce a prepolymer. The method can also include combining the prepolymer with a carrier fluid and a second catalyst to produce a second reaction mixture. The second catalyst can include a dicarboxylic acid, an anhydride, a dihydroxybenzene, or any mixture thereof. The method can also include polymerizing the prepolymer to form polymer particles in gel form.

In at least one specific embodiment, the method for making polymer particles in gel form via emulsion or suspension polymerization can include reacting a first reaction mixture comprising a phenolic monomer and formaldehyde in the presence of a first catalyst to produce a prepolymer. The phenolic monomer can include phenol, resorcinol, or a mixture thereof. The method can also include combining a carrier fluid and a second catalyst with the prepolymer to form an emulsion or a suspension. The second catalyst can include an anhydride, a dihydroxybenzene, or a mixture thereof. The method can also include polymerizing the prepolymer in the emulsion or suspension to produce polymer particles in gel form.

In at least one specific embodiment, a method for making an aerogel can include making a prepolymer from a first reaction mixture that includes a phenolic monomer, formaldehyde, and a first catalyst. The phenolic monomer can include phenol, a first dihydroxybenzene, or a mixture thereof. The first catalyst can include ammonia, dimethylethanolamine, ethylenediamine, triethylamine, trimethylamine, tripropylamine, diethylethanolamine, hexamethylenetetramine, lithium carbonate, or any mixture thereof. The method can also include combining the prepolymer with a carrier fluid and a second catalyst that includes maleic anhydride, a second dihydroxybenzene, or a mixture a mixture thereof to form an emulsion or suspension. The method can also include polymerizing the prepolymer in the emulsion or suspension to form polymer particles in gel form. About 40% or more of the polymer particles in gel form can have an average cross-sectional length greater than or equal to 1 mm. The method can also include drying the polymer particles in gel form to produce an aerogel.

DETAILED DESCRIPTION

Polymer particulates or particles, in gel form, can be produced by polymerizing one or more phenolic monomers, one or more aldehyde monomers, and/or one or more prepolymers in a suspension and/or emulsion polymerization process. The phenolic monomer and the aldehyde monomer can be mixed, blended, or otherwise combined with a first catalyst to produce a first reaction mixture. The first reaction mixture can be reacted to form or otherwise produce a prepolymer. The phenolic monomer, the aldehyde monomer, and/or the prepolymer can be mixed, blended, or otherwise combined with a second catalyst and a carrier fluid to produce a second reaction mixture. The second reaction mixture can be an emulsion and/or suspension. The phenolic monomer, the aldehyde monomer, and/or the prepolymer can be polymerized in the emulsion and/or suspension to produce the particles in gel form.

The polymer particles in gel form can be further processed to produce aerogel, xerogel, and/or cryogel particles, thus avoiding the intermediate production of a monolithic gel structure that requires one or more mechanical processes, e.g., grinding, milling, pulverizing, and the like, to reduce the monolithic gel structure into polymer particles.

As used herein, the term "carrier fluid" refers to any a suspension fluid, solvent, medium, diluent, dispersion fluid, emulsion fluid, and/or the continuous phase of the suspension and/or emulsion.

As used herein, the terms "suspension process," "suspension polymerization process," "dispersion process," and "dispersion polymerization process" are used interchangeably and refer to a heterogeneous polymerization process that uses mechanical agitation to mix the reaction mixture in the carrier or "continuous phase" fluid such as a hydrocarbon and/or water, where the reaction mixture phase and the carrier or continuous phase fluid are not miscible. The reaction mixture can be suspended or dispersed in the carrier fluid or continuous phase as droplets, where the monomer components and/ or prepolymer undergo polymerization to form particles of a polymer and/or curing to form cured particles of polymer.

As used herein, the terms "emulsion process" and "emulsion polymerization process" refer to both "normal" emulsions and "inverse" emulsions. Emulsions differ from suspensions in one or more aspects. One difference is that an emulsion will usually include the use of a surfactant that creates or forms the emulsions (small size droplets). When the carrier or continuous phase fluid is a hydrophilic fluid such as water and the reaction mixture phase is a hydrophobic compound(s), normal emulsions (e.g., oil-in-water) form, where droplets of monomer are emulsified with the aid of a surfactant in the carrier or continuous phase fluid. The monomers and/or prepolymer react in these small size droplets. These droplets are typically small in size as the particles are stopped from coagulating with each other because each particle is surrounded by the surfactant and the charge on the surfactant electrostatically repels other particles. Whereas suspension polymerization usually creates much larger particles than those made with emulsion polymerization. When the carrier or continuous phase fluid is a hydrophobic fluid such as oil and the reaction mixture phase is hydrophilic compounds, inverse-emulsions (e.g., water-in-oil) form.

As used herein, the terms "suspension and/or emulsion process" and "suspension and/or emulsion polymerization" are not limited to or necessarily refer to traditional polymerization. Instead, the terms "suspension and/or emulsion process" and "suspension and/or emulsion polymerization" may, but not necessarily, refer to a curing process or a combination of traditional polymerization and a curing process. As discussed and described herein, in one or more embodiments, the monomer component can be or include a prepolymer and/or a polymer in addition to or in lieu of the monomer mixture alone. The curing process refers to the further crosslinking or hardening of the polymer as compared to the polymerization of a monomer mixture. As such, if a prepolymer is present, the suspension/emulsion process can, in addition to or in lieu of polymerization, also include the curing process. As used herein, the term "curing" refers to the toughening or hardening of polymers via an increased degree of crosslinking of polymer chains. Crosslinking refers to the structural and/or morphological change that occurs in the prepolymer and/or polymer, such as by covalent chemical reaction, ionic interaction or clustering, phase transformation or inversion, and/or hydrogen bonding.

As used herein, the terms "polymer particulates in gel form" and "polymer particles in gel form" are used interchangeably and refer to a network of polymer chains that have one or more pores or voids therein, and a liquid at least partially occupies or fills the one or more pores or voids. As used herein, the terms "dried polymer particulates" and "dried polymer particles" are used interchangeably and refer to a network of polymer chains having one or more pores or voids therein, and a gas at least partially occupies or fills the one or more pores or voids. If the liquid that at least partially occupies or fills the voids is water, the polymer particles can be referred to as "hydrogel polymer particles."

The components of the first reaction mixture, i.e., the phenolic monomer, the aldehyde monomer, and the first catalyst can be combined with one another in any order or sequence. For example, the phenolic monomer can be added, then the aldehyde monomer can be added, then the first catalyst can be added. In another example, the phenolic monomer, the aldehyde monomer, and the first catalyst can be simultaneously combined with one another.

In one or more embodiments, the phenolic monomer, the aldehyde monomer, and the first catalyst can be in a liquid medium in the form of a solution, slurry, suspension, emulsion, or other mixture. For example, the phenolic monomer, the aldehyde monomer and the first catalyst can be in the form of an aqueous solution, slurry, suspension, emulsion, or other mixture. Other suitable liquid mediums can include, but are not limited to, one or more alcohols or water/alcohol mixtures. Illustrative alcohols can include, but are not limited to, methanol, ethanol, propanol, isopropanol, butanol, and the like, and mixtures thereof. Other suitable liquid mediums can include, but are not limited to, acetone, tetrahydrofuran, benzene, toluene, xylene, ethylbenzene, cumene, mesitylene, or mixtures thereof. In one or more embodiments, the polymerization reactions of the phenolic monomer and the aldehyde monomer can produce water as a liquid medium.

The concentration of the liquid medium in the first reaction mixture can range from a low of about 5 wt %, about 10 wt %, about 15 wt %, about 20 wt %, about 25 wt %, about 30 wt %, about 35 wt %, about 40 wt %, or about 45 wt % to a high of about 60 wt %, about 65 wt %, about 70 wt %, about 75 wt %, about 80 wt %, about 85 wt %, about 90 wt %, or about 95 wt %, based on the total weight of the liquid medium, the phenolic monomer, the aldehyde monomer, and the first catalyst.

The phenolic monomer can include one or more phenolic monomers. The one or more phenolic monomers can be or include one or more substituted phenolic monomers, one or more unsubstituted phenolic monomers, or any combination or mixture of substituted and/or unsubstituted phenolic monomers.

In one or more embodiments, suitable phenolic monomers can be represented by Formula I:

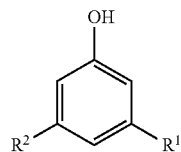

Formula I where R1 and are R2 are independent selected from hydrogen (H), a hydroxy group, C1-5 alkyl, or OR3, where R3 is a C1-5 alkyl or C1-5 aryl, and where at least one of R1 and R2 is a hydroxy group. Other suitable phenolic monomers can be represented by Formula II:

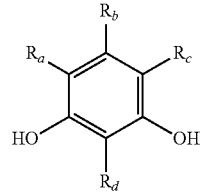

Formula II where each of $R_a$, $R_b$, $R_c$, and $R_d$ is independently hydrogen (H); hydroxy; a halide, e.g., fluoride, chloride, bromide or iodide; a nitro; a benzo; a carboxy; an acyl such as formyl, an alkyl-carbonyl, e.g., acetyl, and an arylcarbonyl, e.g., benzoyl; alkyl such as methyl, ethyl, propyl, butyl, pentyl, hexyl, heptyl, octyl, nonyl, decyl and the like; an alkenyl such as unsubstituted or substituted vinyl and allyl; unsubstituted or substituted methacrylate, unsubstituted or substituted acrylate; silyl ether; siloxanyl; aryl such as phenyl and naphthyl;

aralkyl such as benzyl; or alkaryl such as alkylphenyls, and where at least two of $R_a$, $R_c$, and $R_d$ is hydrogen.

Other suitable phenolic monomer can be or include phenol itself (i.e., mono-hydroxy benzene). Other suitable examples of substituted phenols can include, but are not limited to, alkyl-substituted phenols such as the cresols and xylenols; cycloalkyl-substituted phenols such as cyclohexyl phenol; alkenyl-substituted phenols; aryl-substituted phenols such as p-phenyl phenol; alkoxy-substituted phenols such as 3,5-dimethyoxyphenol; aryloxy phenols such as p-phenoxy phenol; and halogen-substituted phenols such as p-chlorophenol. Dihydric phenols or dihydroxybenzenes such as catechol, resorcinol, hydroquinone, bisphenol A, bisphenol F, or any mixture thereof can also be used. In particular, the phenol component can include phenol; alkyl-substituted phenols such as the cresols and xylenols; cycloalkyl-substituted phenols such as cyclohexyl phenol; alkenyl-substituted phenols; aryl-substituted phenols such as p-phenyl phenol; alkoxy-substituted phenols such as 3,5-dimethyoxyphenol; aryloxy phenols such as p-phenoxy phenol; halogen-substituted phenols such as p-chlorophenol; catechol, hydroquinone, bisphenol A and bisphenol F. In another example, the phenolic monomer can be or include resorcinol, phenol, catechol, hydroquinone, pyrogallol, 5-methylresorcinol, 5-ethylresorcinol, 5-propylresorcinol, 4-methylresorcinol, 4-ethylresorcinol, 4-propylresorcinol, resorcinol monobenzoate, resorcinol monosinate, resorcinol diphenyl ether, resorcinol monomethyl ether, resorcinol monoacetate, resorcinol dimethyl ether, phloroglucinol, benzoylresorcinol, resorcinol rosinate, alkyl substituted resorcinol, aralkyl substituted resorcinol, 2-methylresorcinol, phloroglucinol, 1,2,4-benzenetriol, 3,5-dihydroxybenzaldehyde, 2,4-dihydroxybenzaldehyde, 4-ethylresorcinol, 2,5-dimethylresorcinol, 5-methylbenzene-1,2,3-triol, 3,5-dihydroxybenzyl alcohol, 2,4,6-trihydroxytoluene, 4-chlororesorcinol, 2',6'-dihydroxyacetophenone, 2',4'-dihydroxyacetophenone, 3',5'-dihydroxyacetophenone, 2,4,5-trihydroxybenzaldehyde, 2,3,4-trihydroxybenzaldehyde, 2,4,6-trihydroxybenzaldehyde, 3,5-dihydroxybenzoic acid, 2,4-dihydroxybenzoic acid, 2,6-dihydroxybenzoic acid, 1,3-dihydroxynaphthalene, 2',4'-dihydroxypropiophenone, 2',4'-dihydroxy-6'-methylacetophenone, 1-(2,6-dihydroxy-3-methylphenyl)ethanone, 3-methyl 3,5-dihydroxybenzoate, methyl 2,4-dihydroxybenzoate, gallacetophenone, 2,4-dihydroxy-3-methylbenzoic acid, 2,6-dihydroxy-4-methylbenzoic acid, methyl 2,6-dihydroxybenzoate, 2-methyl-4-nitroresorcinol, 2,4,5-trihydroxybenzoic acid, 3,4,5-trihydroxybenzoic acid, 2,3,4-trihydroxybenzoic acid, 2,4,6-trihydroxybenzoic acid, 2-nitrophloroglucinol or any combination or mixture thereof. Another suitable phenolic monomer can be or include phloroglucinol.

In at least one example, the phenolic monomer can be or include, but is not limited to, phenol, resorcinol, i.e., 1,3-dihydroxybenzene, or a mixture thereof. In an example, the phenolic monomer can be a polyhydroxybenzene, a dihydroxybenzene, a trihydroxybenzene, any combination thereof, or any mixture thereof. The phenolic monomer can include any combination of two or more phenolic monomers combined with one another and/or added independent of one another to the reaction mixture.

Resorcinol monomer can be provided as a white/off-white solid or flake and/or the resorcinol component can be heated and supplied as a liquid. The resorcinol can be provided as a resorcinol-formaldehyde copolymer. The solids component of a resorcinol-formaldehyde copolymer can range from about 5 wt % to about 95 wt %. For example, the solids component of a liquid resorcinol-formaldehyde copolymer can range from a low of about 5 wt %, about 10 wt %, about 15 wt %, about 20 wt %, about 25 wt %, or about 20 wt % to a high of about 50 wt %, about 55 wt %, about 60 wt %, about 65 wt %, about 70 wt %, or about 75 wt %. In another example, the solids component of a liquid resorcinol-formaldehyde copolymer can range from about 10 wt % to about 75 wt %, about 10 wt % to about 40 wt %, about 30 wt % to about 80 wt %, about 45 wt % to about 75 wt %, or about 15 wt % to about 70 wt %. Liquid resorcinol-formaldehyde copolymers can have a Brookfield viscosity at 25° C. that varies widely. For example, liquid resorcinol-formaldehyde copolymer scan have Brookfield viscosity at 25° C. ranging from a low of about 5 centipoise (cP), about 50 cP, about 100 cP, about 200 cP, about 400 cP, or about 600 cP to a high of about 1,000 cP, about 2,500 cP, about 5,000 cP, about 10,000 cP, about 15,000 cP, or about 20,000 cP. Liquid resorcinol copolymers typically have a dark amber color.

The concentration of the one or more phenolic monomers can be from a low of about 5 wt %, about 10 wt %, about 15 wt %, or about 20 wt % to a high of about 30 wt %, about 35 wt %, about 40 wt %, about 45 wt %, or about 50 wt %, based on the total weight of the liquid medium, the phenolic monomer(s), the aldehyde monomer(s), and the first catalyst and/or second catalyst. For example, the concentration of the phenolic monomer can be at least 5 wt %, at least 7 wt %, at least 10 wt %, at least 13 wt %, at least 15 wt %, at least 17 wt %, at least 20 wt %, or at least 23 wt % and up to about 30 wt %, about 35 wt %, about 40 wt %, about 45 wt %, or about 50 wt %, based on the total weight of the liquid medium, the phenolic monomer, the aldehyde monomer, the first catalyst, and the second catalyst. In another example, For example, the concentration of the phenolic monomer can be from a low of about 5 wt %, about 7 wt %, about 10 wt %, about 13 wt %, about 15 wt %, about 17 wt %, about 20 wt %, or about 23 wt % to a high of about 30 wt %, about 35 wt %, about 40 wt %, about 45 wt %, or about 50 wt %, based on the total weight of a carrier fluid (discussed in more detail below), the phenolic monomer, the aldehyde monomer, the first catalyst, and the second catalyst.

In one or more embodiments, the phenolic monomer can be partially or completely replaced with one or more resins. Illustrative resins can include, but are not limited to, a polyethylene, a polypropylene, an ethylene vinyl acetate, an ethylene ethyl acrylate, polyurethane, natural polymers, a styrene-isoprene-styrene, an acrylonitrile-butadiene-styrene, a styrene-butadiene-styrene, a polystyrene, a polyurethane, an acrylic polymer, a polyvinyl chloride, a fluoroplastic, a pine rosin (e.g., tall oil rosin, wood rosin, and gum rosin), a modified rosin (e.g., disproportionated rosins, hydrogenated rosins, polymerized or oligomerized rosins, Diels-Alder rosin adducts), a rosin ester (e.g., hydrogenated rosin esters, polymerized rosin esters, phenolic-modified rosin esters, dibasic acid-modified rosin esters; the rosin esters can be derived from tall oil rosin, wood rosin, and/or gum rosin), a polysulfide, a styrene-acrylonitrile, a nylon, a phenol-formaldehyde novolac resin, or any combination or mixture thereof. Other illustrative resins can include, but are not limited to, oligomers of $C_5$ hydrocarbons (e.g., oligomers of cyclopentadiene), oligomers of $C_9$ hydrocarbons (e.g., oligomers of alpha-methylstyrene and vinyl toluene, often referred to as aromatic hydrocarbon tackifiers), terpene resins (e.g., oligomers of terpenes such as alpha-pinene, beta-pinene, and limonene), oligomeric reaction products of terpenes and phenolics, coumarone-indene resins, oligomeric reaction products of terpenes and styrenics, cycloaliphatic resins (e.g., dicyclopentadiene-based resins), crude tall oil, distilled tall oil, or any combination or mixture thereof. The resin, if present, can be added prior to polymerization, during polymerization, and/or after polymerization has been completed.

The one or more aldehyde monomers can be or include one or more substituted aldehyde monomers, one or more unsubstituted aldehyde monomers, or any combination or mixture of substituted and/or unsubstituted aldehyde monomers. The aldehyde monomer can be or include, but is not limited to, unsubstituted aldehyde compounds and/or substituted aldehyde compounds. Aldehyde compounds suitable for use as the aldehyde monomer component can be represented by the formula RCHO, where R is hydrogen or a hydrocarbon radical. Illustrative hydrocarbon radicals can include from 1 to about 8 carbon atoms. In another example, suitable aldehyde monomer can also include the so-called masked aldehydes or aldehyde equivalents, such as acetals or hemiacetals. Illustrative aldehyde compounds can include, but are not limited to, formaldehyde, paraformaldehyde, acetaldehyde, propionaldehyde, butyraldehyde, furfuraldehyde, benzaldehyde, or any combination or mixture thereof. One or more other aldehydes, such as glyoxal can be used in place of or in combination with formaldehyde and/or other aldehydes. In at least one example, the aldehyde compound can include formaldehyde, UFC, or any combination or mixture thereof.

The aldehyde monomer can be used as a solid, liquid, and/or gas. Considering formaldehyde in particular, the formaldehyde can be or include paraform (solid, polymerized formaldehyde), formalin solutions (aqueous solutions of formaldehyde, sometimes with methanol, in 37 percent, 44 percent, or 50 percent formaldehyde concentrations), Urea-Formaldehyde Concentrate ("UFC"), and/or formaldehyde gas in lieu of or in addition to other forms of formaldehyde can also be used. In another example, the aldehyde can be or include a pre-reacted urea-formaldehyde mixture having a urea to formaldehyde weight ratio of about 1:2 to about 1:3.

The aldehyde monomer can be or include, but is not limited to, one or more multifunctional aldehyde compounds. As used herein, the terms "multifunctional aldehyde compound" and "multifunctional aldehyde" are used interchangeably and refer to compounds having at least two functional groups, with at least one of the functional groups being an aldehyde group. For example, the multifunctional aldehyde can include two or more aldehyde functional groups. In another example, the multifunctional aldehyde can include at least one aldehyde functional group and at least one functional group other than an aldehyde functional group. As used herein, the term "functional group" refers to reactive groups in the multifunctional aldehyde compound and can include, but is not limited to, aldehyde groups, carboxylic acid groups, ester groups, amide groups, imine groups, epoxide groups, aziridine groups, azetidinium groups, and hydroxyl groups.

The multifunctional aldehyde compound can include two or more carbon atoms and have two or more aldehyde functional groups. For example, the multifunctional aldehyde compound can include two, three, four, five, six, or more carbon atoms and have two or more aldehyde functional groups. The multifunctional aldehyde compound can include two or more carbon atoms and have at least one aldehyde functional group and at least one functional group other than an aldehyde group such as a carboxylic acid group, an ester group, an amide group, an imine groups, an epoxide group, an aziridine group, an azetidinium group, and/or a hydroxyl group. For example, the multifunctional aldehyde compound can include two, three, four, five, six, or more carbon atoms and have at least one aldehyde functional group and at least one functional group other than an aldehyde group such as a carboxylic acid group, an ester group, an amide group, an imine groups, an epoxide group, an aziridine group, an azetidinium group, and/or a hydroxyl group.

Suitable bifunctional or difunctional aldehyde compounds that include three (3) or more carbon atoms and have two aldehyde functional groups (—CHO) can be represented by the following formula:

where R is a divalent aliphatic, cycloaliphatic, aromatic, or heterocyclic group having from 1 to 12 carbon atoms. Illustrative multi-functional aldehydes can include, but are not limited to, malonaldehyde, succinaldehyde, glutaraldehyde, 2-hydroxyglutaraldehyde, β-methylglutaraldehyde, adipaldehyde, pimelaldehyde, suberaldehyde, malealdehyde, fumaraldehyde, sebacaldehyde, phthalaldehyde, isophthalaldehyde, terephthalaldehyde, ring-substituted aromatic aldehydes, or any combination or mixture thereof. A suitable bifunctional or difunctional aldehyde that includes two carbon atoms and has two aldehyde functional groups is glyoxal.

Illustrative multifunctional aldehyde compounds that include an aldehyde group and a functional group other than an aldehyde group can include, but are not limited to, glyoxylic acid, glyoxylic acid esters, glyoxylic acid amides, 5-(hydroxymethyl)furfural, or any combination or mixture thereof. The aldehyde group in the multifunctional aldehyde compound can exist in other forms, e.g., as a hydrate. As such, any form or derivative of a particular multifunctional aldehyde compound can be used to prepare the binder compositions discussed and described herein. For example, in the context of glyoxylic acid, glyoxylic acid, glyoxylic acid monohydrate, and/or glyoxylate can be combined with the tannins and the Lewis acid to produce the binder composition.

The concentration of the one or more aldehyde monomers can be from a low of about 3 wt %, about 5 wt %, about 7 wt %, about 10 wt %, about 15 wt %, or about 20 wt % to a high of about 30 wt %, about 45 wt %, about 50 wt %, about 55 wt %, about 60 wt %, or about 70 wt %, based on the total weight of the liquid medium, the phenolic monomer(s), the aldehyde monomer(s), and the first and/or second catalyst. For example, the concentration of the aldehyde monomer can be at least 3 wt %, at least 5 wt %, at least 7 wt %, at least 10 wt %, at least 13 wt %, at least 15 wt %, at least 17 wt %, at least 20 wt %, at least 23 wt %, or at least 25 wt % and up to about 45 wt %, about 50 wt %, about 55 wt %, about 60 wt %, or about 70 wt %, based on the total weight of the liquid medium, the phenolic monomer, the aldehyde monomer, the first catalyst and the second catalyst. In another example, the concentration of the aldehyde monomer can be from a low of about 3 wt %, about 5 wt %, about 7 wt %, about 10 wt %, about 15 wt %, or about 20 wt % to a high of about 30 wt %, about 45 wt %, about 50 wt %, about 55 wt %, about 60 wt %, or about 70 wt %, based on the total weight of the carrier fluid (discussed in more detail below), the phenolic monomer, the aldehyde monomer, the first catalyst, and the second catalyst.

If any one or more of the components discussed and described herein include two or more different compounds, those two or more different compounds can be present in any ratio with respect to one another. For example, if the phenolic monomer includes a first phenolic monomer and a second phenolic monomer, the phenolic monomer can have a concentration of the first phenolic monomer be from about 1 wt % to about 99 wt % and conversely about 99 wt % to about 1 wt % of the second phenolic monomer, based on the total weight of the first and second phenolic monomer. In another example, the amount of the first phenolic monomer can be from a low of about 5 wt %, about 10 wt %, about 15 wt %, about 20 wt %, about 25 wt % about 30 wt %, about 35 wt %, about 40 wt %, or about 45 wt % to a high of about 60 wt %, about 65 wt %, about 70 wt %, about 75 wt %, about 80 wt %, about 85 wt %, about 90 wt %, or about 95 wt %, based on the total weight of the first and second phenolic monomer. When the crosslinking compound, catalyst, and/or liquid medium includes two or more different compounds, those two or more different compounds can be present in similar amounts as the first and second phenolic monomer.

The first catalyst can also be referred to as an initiator, a reducer, and/or an accelerator. The first catalyst can be unconsumed by the polymerization reaction. The first catalyst can be partially consumed by the polymerization reaction. The first catalyst can be consumed by the polymerization reaction. For example, consumption or at least partial consumption of the first catalyst can include the first catalyst reacting with the phenolic monomer, the aldehyde monomer, the second catalyst (upon the addition thereof), the prepolymer, itself, or any combination thereof. The first catalyst can include one or more amines and/or one ore more metal catalysts. Illustrative first catalysts can include, but are not limited to ammonia, dimethylethanolamine (DMEA), ethylenediamine (EDA), triethylamine (TEA), trimethylamine, tripropylamine, diethylethanolamine, hexamethylenetetramine (hexamine), lithium carbonate, and any mixture thereof.

The concentration of the first catalyst in the first reaction mixture can be from about 1 wt % to about 30 wt %, based on the weight of the phenolic monomer. For example, the concentration of the first catalyst in the first reaction mixture can be from about 0.1 wt % to about 1 wt %, about 1 wt % to about 2 wt %, about 2 wt % to about 3 wt %, about 3 wt % to about 5 wt %, about 5 wt % to about 10 wt %, based on the weight of the phenolic monomer. In another example, the concentration of the first catalyst can be from a low of about 0.05 wt %, about 0.1 wt %, about 0.5 wt %, about 1 wt %, about 1.5 wt %, about 2 wt %, about 2.5 wt %, about 3 wt %, about 3.5 wt %, about 4 wt %, about 4.5 wt %, or about 5 wt % to a high of about 7 wt %, about 10 wt %, about 13 wt %, about 15 wt %, about 17 wt %, about 20 wt %, about 23 wt %, about 25 wt %, about 27 wt %, or about 30 wt %, based on the weight of the phenolic monomer.

The concentration of the first catalyst in the first reaction mixture can be from about 1 wt % to about 30 wt %, based total weight of the phenolic monomer, the aldehyde monomer, and the liquid medium. For example, the concentration of the first catalyst in the first reaction mixture can be from about 0.1 wt % to about 10 wt %, based on the total weight of the phenolic monomer, the aldehyde monomer, and the liquid medium. In another example, the concentration of the first catalyst in the first reaction mixture can be from about 0.1 wt % to about 1 wt %, about 1 wt % to about 2 wt %, about 2 wt % to about 3 wt %, about 3 wt % to about 5 wt %, about 5 wt % to about 10 wt %, based on the total weight of the phenolic monomer, the aldehyde monomer, and the liquid medium. In another example, the concentration of the first catalyst in the first reaction mixture can be from a low of about 0.05 wt %, about 0.1 wt %, about 0.5 wt %, about 1 wt %, about 1.5 wt %, about 2 wt %, about 2.5 wt %, about 3 wt %, about 3.5 wt %, about 4 wt %, about 4.5 wt %, or about 5 wt % to a high of about 7 wt %, about 10 wt %, about 13 wt %, about 15 wt %, about 17 wt %, about 20 wt %, about 23 wt %, about 25 wt %, about 27 wt %, or about 30 wt %, based on the total weight of the phenolic monomer, the aldehyde monomer, and the liquid medium. In another example, the concentration of the first catalyst in the first reaction mixture can be from a low of about 0.05 wt %, about 0.1 wt %, about 0.5 wt %, about 1 wt %, about 1.5 wt %, about 2 wt %, about 2.5 wt %, about 3 wt %, about 3 wt %, about 4 wt %, about 4.5 wt %, or about 5 wt % to a high of about 7 wt %, about 10 wt %, about 13 wt %, about 15 wt %, about 17 wt %, about 20 wt %, about 23 wt %, about 25 wt %, about 27 wt %, or about 30 wt %, based on the total weight of the phenolic monomer, the aldehyde monomer, and a carrier fluid (discussed in more detail below).

The molar ratio of the phenolic monomer to first catalyst can range from a low of about 1 to a high of about 400. For example, the molar ratio of the phenolic monomer to first catalyst can range from a low of about 1, about 5, about 10, or about 15 to a high of about 45, about 50, about 60, about 80, about 100, about 125, about 150, about 175, about 200, about 225, about 250, about 275, about 300, about 325, or about 350. In another example, the molar ratio of the phenolic monomer to first catalyst can range from a low of about 1, about 3, about 5, about 8, about 10, about 12, or about 15 to a high of about 20, about 25, about 20, about 37, about 40, about 43, about 45, or about 49. In another example, the molar ratio of the phenolic monomer to first catalyst can be less than 200, less than 150, less than 125, less than 100, less than 75, less than 60, less than 50, less than 49, less than 47, less than 45, less than 43, less than 40, less than 37, or less than 35.

Prior to forming or producing the suspension and/or emulsion with the carrier fluid, the phenolic monomer and aldehyde monomer can be at least partially polymerized with one another to produce a prepolymer. For example, the phenolic monomer and aldehyde monomer can be prepolymerized with a first catalyst in a first reaction mixture. The prepolymerization can be performed at a reaction temperature of about 20° C., about 30° C., about 40° C., about 50° C., or about 60° C. In another example, the phenolic monomer and aldehyde monomer can be prepolymerized with the first catalyst in the first reaction mixture at a temperature from about 40° C. to about 60° C., about 60° C. to about 80° C., or about 80° C. to about 100° C. In another example, the phenolic monomer and aldehyde monomer can be prepolymerized at a temperature form a low of about 20° C., about 40° C., about 60° C., about 80° C., or about 90° C. to a high of about 95° C., about 100° C., about 125° C., 150° C., about 175° C., about 200° C., about 225° C., about 250° C., about 275° C., or about 300° C. In one or more embodiments, the phenolic monomer and aldehyde monomer can be pre-polymerized under pressure and the temperature during the prepolymerization can be up to the boiling point of the reaction mixture. In one or more embodiments, the phenolic monomer and aldehyde monomer can be pre-polymerized under pressure and the temperature during the prepolymerization can be less than the boiling point of the reaction mixture.

The reaction of first reaction mixture can be carried out under a wide range of pH values. For example, the first reaction mixture can be at a pH from a low of about 1, about 2, or about 3 to a high of about 7, about 8, about 9, about 10, about 11, or about 12. In one or more embodiments, the first reaction mixture can be at acidic conditions. For example, the pH of the first reaction mixture can be less than about 7, less than about 6.5, less than about 6, less than about 5.5, less than about 5, less than about 4.5, or less than about 4. In another example, the pH of the first reaction mixture can be from about 1 to about 6.5, about 1.5 to about 5.5, about 2 to about 5, about 1.5 to about 4.5, about 1 to about 4, about 2 to about 4, about 1 to about 3.5, or about 2 to about 4.5.

The prepolymer can have a molar ratio of the one or more phenolic monomers to the one or more aldehyde monomers from a low of about 0.1:1 to a high of about 1.5:1. For example, the molar ratio of the one or more phenolic monomers to the one or more aldehyde monomers can be about 0.2:1 to about 1.4:1, about 0.8:1 to about 1.3:1, about 0.2:1 to about 0.9:1, about 0.3:1 to about 0.8:1, about 0.4:1 to about 0.8:1, about 0.4:1 to about 0.7:1, or about 0.4:1 to about 0.6:1. In at least one example, the molar ratio of the one or more phenolic monomers to the one or more aldehyde monomers can be about 0.4:1, about 0.5:1, about 0.6:1, about 0.7:1, about 0.8:1, about 0.9:1, or about 1:1.

The prepolymer can have a weight average molecular weight (Mw) ranging from a low of about 200, about 300, or about 400 to a high of about 1,000, about 2,000, or about 10,000. In another example, the prepolymer can have a weight average molecular weight ranging from about 250 to about 450, about 450 to about 550, about 1,550 to about 2,950, about 3,950 to about 5,500, about 5,600 to about 7,500, or about 7,500 to about 9,500. In another example, the prepolymer can have a weight average molecular weight of about 175 to about 800, about 700 to about 3,330, about 1,100 to about 4,200, about 230 to about 550, about 425 to about 875, or about 475 to about 775.

The prepolymer can have an amount of free formaldehyde from about 0 wt % to about 20 wt %. For example, the prepolymer can have a concentration of free formaldehyde from a low of about 0.1 wt %, about 1 wt %, about 3 wt %, about 5 wt %, about 7 wt %, or about 9 wt % to a high of about 11 wt %, about 13 wt %, about 15 wt %, about 17 wt %, or about 20 wt %. In another example, the prepolymer can have a concentration of free formaldehyde from a low of about 0 wt %, about 0.5 wt %, about 1 wt %, or about 2 wt % to a high of about 3 wt %, about 5 wt %, or about 6 wt %, based on the total weight of the prepolymer. In another example, the prepolymer can have an amount of free formaldehyde from about 0 to about 0.8 wt %, about 1 wt % to 2.5 wt %, about 3.2 wt % to about 4.3 wt %, or about 5 wt % to about 5.7 wt %, base on the weight of the prepolymer. In still another example, the amount of free formaldehyde in the prepolymer can be less than 20 wt %, less than 17 wt %, less than 15 wt %, less than 13 wt %, less than 11 wt %, less than 9 wt %, less than 7 wt %, less than 5 wt %, less than 3 wt %, less than 1 wt %, less than 0.7 wt %, less than 0.5 wt %, less than 0.3 wt %, less than 0.1 wt %, or less than 0.05 wt %.

The prepolymer can have an amount of free phenol from about 0 wt % to about 20 wt %. For example, the prepolymer can have a concentration of free phenol from a low of about 0.1 wt %, about 1 wt %, about 3 wt %, about 5 wt %, about 7 wt %, or about 9 wt % to a high of about 11 wt %, about 13 wt %, about 15 wt %, about 17 wt %, or about 20 wt %. In another example, the prepolymer can have a concentration of free phenol from a low of about 0 wt %, about 0.5 wt %, about 2 wt %, or about 4 wt % to a high of about 8 wt %, about 10 wt %, or about 12 wt %, based on the total weight of the prepolymer. In another example, the prepolymer can have an amount of free phenol form about 0 to about 1.5 wt %, about 2 wt % to 4.5 wt %, about 5.2 wt % to about 6.3 wt %, about 7.2 wt % to about 8.8 wt % or about 9 wt % to about 10.7 wt %, based on the weight of the prepolymer. In still another example, the amount of free phenol in the prepolymer can be less than 20 wt %, less than 17 wt %, less than 15 wt %, less than 13 wt %, less than 11 wt %, less than 9 wt %, less than 7 wt %, less than 5 wt %, less than 3 wt %, less than 1 wt %, less than 0.7 wt %, less than 0.5 wt %, less than 0.3 wt %, less than 0.1 wt %, or less than 0.05 wt %.

The prepolymer can have a gel time (stroke cure at 150° C.) from about 50 s to about 250 s. For example, the prepolymer can have a gel time from a low of about 52 s, about 58 s, about 63 s to a high of about 225 s, about 235 s, about 248 s. In another example, the polymer particles in gel form can have a gel time from about 50 s to about 72 s, about 75 s to about 110 s, about 120 s to 180 s, 202 s to about 220 s, or about 228 s to about 245 s.

At least a portion of the prepolymer or the first reaction mixture can be mixed, blended, stirred, or otherwise combined with one or more carrier fluids and/or one or more second catalysts to form the second reaction mixture. The second reaction mixture can be a suspension and/or emulsion. At least portion of the prepolymer can be added to the carrier fluid, the carrier fluid can be added to the prepolymer, or the prepolymer and the carrier fluid can be simultaneously combined with one another to form suspension or emulsion. The prepolymer can be a partially reacted, e.g., polymerized, mixture of the phenolic monomer and aldehyde monomer, or fully reacted with one another to provide the prepolymer. If the prepolymer is a fully reacted product between the phenolic monomer and the aldehyde monomer the suspension and/or emulsion process can be used to more fully cure or "age" the prepolymer therein or fully cure or "age" the prepolymer therein.

The individual components of the second reaction mixture, e.g., the phenolic monomer, the aldehyde monomer, the first catalyst, the second catalyst and/or the prepolymer, can each independently be mixed, blended, contacted, located, placed, directed, added, disposed, or otherwise combined with the carrier fluid in any order or sequence to produce the suspension and/or emulsion. In other words, one or less than all of the components that make up the monomer component can be combined with the carrier fluid to form or produce an intermediate suspension and/or emulsion. For example, the phenolic monomer and the catalyst can be combined with the carrier fluid to form or produce an intermediate suspension and/or emulsion and the aldehyde monomer can be combined with the intermediate suspension and/or emulsion to form or produce the suspension and/or emulsion of the reaction mixture and the carrier fluid. In another example, the carrier fluid can be combined with one or more components of the monomer component, e.g., the phenolic monomer, to produce an intermediate suspension and/or emulsion and one or more other components, e.g., the aldehyde monomer, can be added to the intermediate suspension and/or emulsion to produce a second intermediate suspension and/or emulsion. To the second intermediate suspension and/or emulsion the catalyst can be added to produce final suspension and/or emulsion. In other words, the phenolic monomer, the crosslinking compound, the catalyst, and/or the carrier fluid can be combined with one another in any order or sequence and/or any two or more components can be simultaneously combined with one another to produce the suspension and/or emulsion.

In one or more embodiments, the phenolic monomer, the aldehyde monomer, the first catalyst, the second catalyst and/or the prepolymers can be in a liquid medium in the form of a solution, slurry, suspension, emulsion, or other mixture. For example, the phenolic monomer, the aldehyde monomer, the prepolymer, and/or the first and/or second catalyst can be in the form of an aqueous solution, slurry, suspension, emulsion, or other mixture. Other suitable liquid mediums can include, but are not limited to, one or more alcohols or water/alcohol mixtures. Illustrative alcohols can include, but are not limited to, methanol, ethanol, propanol, isopropanol, butanol, and the like, and mixtures thereof. Other suitable liquid mediums can include, but are not limited to, acetone, tetrahydrofuran, benzene, toluene, xylene, ethylbenzene, cumene, mesitylene, or mixtures thereof. In one or more embodiments, the polymerization reactions of the phenolic monomer, the aldehyde monomer, and the prepolymers can produce water as a liquid medium.

The concentration of the liquid medium in the phenolic monomer, aldehyde monomer, and/or prepolymers can range from a low of about 5 wt %, about 10 wt %, about 15 wt %, about 20 wt %, about 25 wt %, about 30 wt %, about 35 wt %, about 40 wt %, or about 45 wt % to a high of about 60 wt %, about 65 wt %, about 70 wt %, about 75 wt %, about 80 wt %, about 85 wt %, about 90 wt %, or about 95 wt %, based on the total weight of the liquid medium, the phenolic monomer, the aldehyde monomer, and the first catalyst and/or second catalysts.

The second catalyst can also be referred to as an initiator, a reducer, and/or an accelerator. The second catalyst can be unconsumed by the polymerization reaction. The second catalyst can be partially consumed by the polymerization reaction. The second catalyst can be consumed by the polymerization reaction. For example, consumption or at least partial consumption of the second catalyst can include the second catalyst reacting with the phenolic monomer, the aldehyde monomer, the first catalyst, the prepolymer, itself, or any combination thereof. The second catalyst can include one or more dicarboxylic acids, one or more anhydrides, one or more dihydroxybenzenes, any combination thereof, or any mixture thereof. Illustrative second catalysts can include, but are not limited to, maleic anhydride, maleic acid, phthalic anhydride, phthalic acid, resorcinol, catechol, hydroquinone, bisphenol A, bisphenol F, any combination thereof, or any mixture thereof. For example, the second catalyst can include maleic anhydride, resorcinol, or a mixture of maleic anhydride and resorcinol.

It should be noted that, as discussed above, dihydroxybenzene can be or make up at least a portion of the phenolic monomer component. As such, one or more dihydroxybenzenes can be or make up at least a portion of the phenolic monomer component and/or can be or make up at least a portion of the second catalyst. If the phenolic monomer and the second catalyst both include a dihydroxybenzene, the dihydroxybenzene in the phenolic monomer can be referred to as a "first dihydroxybenzene" and the dihydroxybenzene in the second catalyst can be referred to as a "second dihydroxybenzene." When a dihydroxybenzene is used as the second catalyst, the dihydroxybenzene making up the second catalyst can be added to the prepolymer formed by reacting the first reaction mixture that includes the phenolic monomer, which may or may not include the first dihydroxybenzene, the aldehyde monomer, and the first catalyst. It should also be noted that the phenolic monomer and the second catalyst can both include the same dihydroxybenzene compound. For example, in at least one embodiment the phenolic monomer can be or include resorcinol and the second catalyst can also be or include resorcinol.

The concentration of the second catalyst in the second reaction mixture can be from about 1 wt % to about 30 wt %, based on the weight of the phenolic monomer. For example, the concentration of the second catalyst in the second reaction mixture can be from about 0.1 wt % to about 1 wt %, about 1 wt % to about 2 wt %, about 2 wt % to about 3 wt %, about 3 wt % to about 5 wt %, about 5 wt % to about 10 wt %, based on the weight of the phenolic monomer. In another example, the concentration of the second catalyst in the second reaction mixture can be from a low of about 0.1 wt %, about 0.3 wt %, about 0.5 wt %, about 0.7 wt %, about 1 wt %, about 1.3 wt %, about 1.5 wt %, about 1.7 wt %, about 2 wt %, about 2.3 wt %, bout 2.5 wt %, about 3 wt %, about 3.5 wt %, about 3.7 wt %, or about 4 wt % to a high of about 5 wt %, about 5.5 wt %, about 6 wt %, about 6.5 wt %, about 7 wt %, about 7.5 wt %, about 8 wt %, about 8.5 wt %, about 9 wt %, or about 9.5 wt %, based on the weight of the phenolic monomer.

The concentration of the second catalyst in the second reaction mixture can be from about 0.1 wt % to about 30 wt %, based on the total weight of the phenolic monomer, the aldehyde monomer, and the liquid medium. In another example, the concentration of the second catalyst in the second reaction mixture can be from about 0.1 wt % to about 1 wt %, about 1 wt % to about 2 wt %, about 2 wt % to about 3 wt %, about 3 wt % to about 5 wt %, about 5 wt % to about 10 wt %, based on the total weight of the phenolic monomer, the aldehyde monomer, and the liquid medium. In another example, the concentration of the second catalyst in the second reaction mixture can be from a low of about 0.1 wt %, about 0.3 wt %, about 0.5 wt %, about 0.7 wt %, about 1 wt %, about 1.3 wt %, about 1.5 wt %, about 1.7 wt %, about 2 wt %, about 2.3 wt %, bout 2.5 wt %, about 3 wt %, about 3.5 wt %, about 3.7 wt %, or about 4 wt % to a high of about 5 wt %, about 7 wt %, about 9 wt %, about 11 wt %, about 13 wt %, about 15 wt %, about 17 wt %, about 19 wt %, about 21 wt %, about 23 wt %, about 25 wt %, about 27 wt %, or about 29 wt %, based on the total weight of the phenolic monomer, the aldehyde monomer, and the liquid medium. In another example, the concentration of the second catalyst in the second reaction mixture can be from a low of about 0.1 wt %, about 0.3 wt %, about 0.5 wt %, about 0.7 wt %, about 1 wt %, about 1.3 wt %, about 1.5 wt %, about 1.7 wt %, about 2 wt %, about 2.3 wt %, bout 2.5 wt %, about 3 wt %, about 3.5 wt %, about 3.7 wt %, or about 4 wt % to a high of about 5 wt %, about 7 wt %, about 9 wt %, about 11 wt %, about 13 wt %, about 15 wt %, about 17 wt %, about 19 wt %, about 21 wt %, about 23 wt %, about 25 wt %, about 27 wt %, or about 29 wt %, based on the total weight of the phenolic monomer, the aldehyde monomer, and the carrier fluid (discussed in more detail below).

The molar ratio of the phenolic monomer to second catalyst can be from a low of about 1 to a high of about 400. For example, the molar ratio of the phenolic monomer to the second catalyst can range from a low of about 1, about 5, about 10, or about 15 to a high of about 45, about 50, about 60, about 80, about 100, about 125, about 150, about 175, about 200, about 225, about 250, about 275, about 300, about 325, or about 350. In another example, the molar ratio of the phenolic monomer to the second catalyst can be from a low of about 1, about 3, about 5, about 8, about 10, about 12, or about 15 to a high of about 20, about 25, about 20, about 37, about 40, about 43, about 45, or about 49. In another example, the molar ratio of the phenolic monomer to the second catalyst can be less than 200, less than 150, less than 125, less than 100, less than 75, less than 60, less than 50, less than 49, less than 47, less than 45, less than 43, less than 40, less than 37, or less than 35 and about 1 or more, about 4 or more, about 10 or more, or about 15 or more.

The suspension and/or emulsion can have a concentration of the phenolic monomer, aldehyde monomer, and/or prepolymer from about 1 wt % to about 90 wt %, based on the combined weight of the phenolic monomer, aldehyde monomer, the carrier fluid, and/or prepolymer. For example, the suspension and/or emulsion can have a concentration of the phenolic monomer, aldehyde monomer, and/or prepolymer from a low of about 10 wt %, about 15 wt %, about 20 wt %, or about 25 wt % to a high of about 40 wt %, about 50 wt %, about 60 wt %, or about 70 wt %, based on the combined weight of the phenolic monomer, aldehyde monomer, and the carrier fluid. In another example, phenolic monomer and aldehyde monomer in the suspension and/or emulsion can be from about 25 wt % to about 35 wt %, about 20 wt % to about 45 wt %, about 30 wt % to about 50 wt %, about 10 wt % to about 25 wt %, or about 15 wt % to about 50 wt %, based on the combined weight of the phenolic monomer, aldehyde monomer, liquid medium, and the carrier fluid.

The carrier fluid can be or include one or more hydrocarbons, water, or a combination or mixture thereof. Illustrative carrier fluids can include paraffinic oils, naphthenic oils, aromatic oils, or any combination or mixture thereof. Illustrative paraffinic hydrocarbons can include mineral oils or any thereof. Suitable mineral oils include one or more alkanes having from about 15 to about 40 carbon atoms. Illustrative naphthenic oils can be hydrocarbons based on cycloalkanes. Illustrative cycloalkanes can include, but are not limited to, cyclohexane, cycloheptane, cyclooctane, cyclononane, cyclodecane, or any combination or mixture thereof. Another suitable carrier fluid can be or include one or more plant based or plant derived oils. Illustrative plant based or plant derived oils can include, but are not limited to, such as linseed (flaxseed) oil, castor oil, tung oil, soybean oil, cottonseed oil, olive oil, canola oil, corn oil, sunflower seed oil, peanut oil, coconut oil, safflower oil, palm oil, vegetable oil, or any combination or mixture thereof. Suitable commercially available vegetable oils can include, but are not limited to, those sold under the tradename WESSON® and sold by CONAGRA FOODS®, such as the vegetable oil, canola oil, corn oil, blended oils, and the like. Another suitable carrier fluid can be or include one or more chlorinated hydrocarbons. Illustrative chlorinated hydrocarbons can include, but are not limited to, carbon tetrachloride, chloroform, methylene chloride, or any combination or mixture thereof. Any type of water can be used as the carrier fluid or to make-up at least a portion of the carrier fluid. For example, the water can be distilled water, deionized water, or a combination or mixture thereof. In another example, the water can be tap water.

The use of a carrier fluid that contains or includes water can reduce the cost associated with the production of the polymer particles in gel form as compared to the use of hydrocarbons. The use of a carrier fluid that contains or includes water can also allow for an increased concentration of the monomer component relative to the carrier fluid as compared to a carrier fluid that contains one or more hydrocarbons and is free or substantially free of water, e.g., less than 5 wt % water. In other words, a carrier fluid that is or includes a majority of water, e.g., greater than about 50 wt % water, can allow for a more concentrated suspension and/or emulsion to be formed as compared to when the carrier fluid is or includes a majority of non-water fluid(s), e.g., greater than about 50 wt % hydrocarbons. The use of a carrier fluid that is or includes water may also at least partially remove any residual carrier fluid composed of one or more hydrocarbons.

The carrier fluid can have a boiling point of about 40° C. or more, about 50° C. or more, about 60° C. or more, about 70° C. or more, about 80° C. or more, about 90° C. or more, about 100° C. or more, about 110° C. or more, about 120° C. or more, about 130° C. or more, about 140° C. or more, or about 150° C. or more. The carrier fluid can have a flash point greater than about −25° C., greater than about −20° C., greater than about −10° C., greater than about 0° C., greater than about 10° C., greater than about 20° C., greater than about 30° C., greater than about 40° C., greater than about 50° C., or greater than about 60° C.

In one or more embodiments, the carrier fluid can be free or substantially free of cycloalkanes, e.g., cyclohexane, cycloheptane, cyclooctane, and the like. For example, the carrier fluid can contain less than about 1 wt % cyclohexane, based on the total weight of the carrier fluid. As such, it should also be noted that one other difference between the suspension and/or emulsion polymerization process and the conventional inverse emulsion polymerization process used to produce polymer particles in gel form can be that the use of cyclohexane as the carrier fluid can be avoided. Similarly, another difference between the suspension and/or emulsion polymerization process and the conventional inverse emulsion polymerization process used to produce polymer particles in gel form can be that the use of cycloalkanes as the carrier fluid can be avoided.

The suspension and/or emulsion can also be heated to accelerate the polymerization of the phenolic monomer and aldehyde monomer and/or the prepolymer. For example, the suspension and/or emulsion can be heated to an elevated temperature ranging from a low of about 20° C., about 30° C., about 40° C., about 50° C., about 70° C., about 80° C., or about 90° C. to a high of about 95° C., about 100° C., about 110° C., about 125° C., 150° C., about 175° C., about 200° C., about 225° C., about 250° C., about 275° C., or about 300° C. For example, the temperature of the suspension and/or emulsion can be maintained, e.g., from about 80° C. to about 99° C., until the suspension and/or emulsion polymerization, i.e., the polymerization between the phenolic monomer and the aldehyde monomer, reaches a desired degree or level of polymerization. In another example, the temperature of the suspension and/or emulsion can be maintained at a temperature of about 80° C. or more, about 83° C. or more, about 85° C. or more, about 87° C. or more, about 90° C. or more, about 93° C. or more, about 95° C. or more, about 97° C. or more, about 98° C. or more, about 99° C. or more, about 100° C. or more, about 103° C. or more, about 105° C. or more, about 107° C. or more, about 110° C. or more about 112° C. or more, or about 115° C. or more until the suspension and/or emulsion polymerization reaches a desired degree or level of polymerization and/or curing. As noted above, the suspension and/or emulsion process can be carried out under acidic and/or basic conditions. The suspension and/or emulsion polymerization can be conducted until the polymer particles maintain their integrity so that they do not or substantially do not "stick" or "glue" together with one another. The polymerization can be reduced or stopped by decreasing the temperature of the suspension and/or emulsion and/or polymer particles in gel form. The cooled suspension and/or emulsion and/or polymer particles in gel form can be stored for further processing.

The suspension/emulsion polymerization in the second reaction mixture can be carried out under a wide range of pH values. For example, the suspension/emulsion process can be carried out at a pH from a low of about 1, about 2, or about 3 to a high of about 7, about 8, about 9, about 10, about 11, or about 12. In one or more embodiments, the suspension/emulsion process can be carried out under acidic conditions. For example, the pH of the reaction mixture or at least the monomer component can be less than about 7, less than about 6.5, less than about 6, less than about 5.5, less than about 5, less than about 4.5, or less than about 4. In another example, the pH of the second reaction mixture can be from about 1 to about 6.5, about 1.5 to about 5.5, about 2 to about 5, about 1.5 to about 4.5, about 1 to about 4, about 2 to about 4, about 1 to about 3.5, or about 2 to about 4.5.

The suspension and/or emulsion can be agitated to improve and/or maintain a homogeneous or substantially homogenous distribution of the reaction mixture within or in the carrier fluid (suspension and inverse emulsion) or a homogeneous or substantially homogenous distribution of the carrier fluid within or in the reaction mixture (suspension and normal emulsion). The components of the suspension and/or emulsion can be combined within one or more mixers. The mixer can be or include any device, system, or combination of device(s) and/or system(s) capable of batch, intermittent, and/or continuous mixing, blending, contacting, or the otherwise combining of two or more components, e.g., the phenolic monomer and the crosslinking compound or the suspension and/or emulsion that includes the monomer component and the carrier fluid. Illustrative mixers can include, but are not limited to, mechanical mixer agitation, ejectors, static mixers, mechanical/power mixers, shear mixers, sonic mixers, vibration mixing, e.g., movement of the mixer itself, or any combination thereof. The mixer can include one or more heating jackets, heating coils, internal heating elements, cooling jackets, cooling coils, internal cooling elements, or the like, to regulate the temperature therein. The mixer can be an open vessel or a closed vessel. The components of the suspension and/or emulsion can be combined within the mixer under a vacuum, at atmospheric pressure, or at pressures greater than atmospheric pressure. The components of the suspension and/or emulsion can be combined within the mixer and heated to a temperature from about 1° C. to about 300° C. The mixer can be capable of producing a homogeneous suspension and/or emulsion. In other words, the mixer can produce a suspension and/or emulsion in which the distribution of the monomer component is substantially the same throughout the carrier fluid. It should be noted that an emulsion does not necessarily require any agitation in order to form and/or maintain the emulsion, but such agitation can be used to accelerate and/or improve the homogeneous distribution of the components within the emulsion. As such, if an emulsion alone is formed the emulsion does not necessarily require external energy such as mechanical and/or acoustic energy in order to form and/or maintain the emulsion.

The particular method or combination of methods used to agitate the suspension and/or emulsion can be used, at least in part, as one variable that can be controlled or adjusted to influence the size and/or morphology of the polymer particles in gel form. For example, if a stirring paddle or blade agitates the suspension and/or emulsion by rotation within the suspension and/or emulsion, the speed at which the stirring paddle or blade rotates can influence the size of the polymer particles in gel form. The particular shape or configuration of the stirring paddle or blade can also influence the size of the polymer particles in gel form.

Once the suspension and/or emulsion forms the phenolic monomer and the aldehyde monomer and/or the prepolymer can be polymerized to produce the polymer particles in gel form. As discussed and described above, the suspension and/or emulsion process can also include curing in addition to or in lieu of traditional polymerization. The phenolic monomer, the aldehyde monomer, and/or prepolymer can form small droplets or micelles in suspension and/or emulsion. The phenolic monomer, aldehyde monomer, and/or the prepolymer contained within the droplets or micelles can undergo polymerization and/or curing to produce the polymer particles in gel form. The liquid that can at least partially fill any pores or voids in the polymer gel particles can be present in the reaction mixture and/or formed during polymerization of the monomer component.

The phenolic monomer, the aldehyde monomer, and/or the prepolymer can undergo suspension and/or emulsion polymerization within the mixer. The phenolic monomer and aldehyde monomer can be removed from the mixer and introduced into another vessel or container "reactor" in which the suspension and/or emulsion can undergo suspension and/or emulsion polymerization. Illustrative mixers/reactors can include batch, intermittent, and/or continuous type mixers or reactors. A continuous mixer or reactor, for example, can be a "loop" reactor. The suspension and/or emulsion can be formed within other systems, devices, and/or combinations thereof in addition to the one or more mixers discussed and described above. For example, suitable suspension and/or emulsion polymerizations processes can also be carried out under gas phase conditions. For example, the phenolic monomer and aldehyde monomer, the carrier fluid, and/or the second catalyst can be in the gaseous phase. In another example, the phenolic monomer and aldehyde monomer, and the carrier fluid can be in the gaseous phase and the catalyst can be in the solid and/or liquid phase. Accordingly, in one or more embodiments, the reaction mixture or at least one or more components of the reaction mixture can be introduced to the reactor in gas phase. In one or more embodiments, the reaction mixture or at least one or more of the components thereof can be in a liquid phase. In one or more embodiments, the reaction mixture or at least one or more monomer thereof can be in a solid phase.

Other suitable suspension and/or emulsion processes can be carried out in a continuous process and/or a batch process. Illustrative processes can include, but are not limited to, continuous stirred tank reactor (CSTR), loop reactor, and/or plug flow reactors. The suspension and/or emulsion process can be carried out in one reactor or more than one reactor. When two or more reactors are used the two or more reactor same be the same or different. When two or more reactors are used the two or more reactors can be operated in series and/or parallel. These reactors may have or may not have internal cooling or heating.

Referring to the loop reactor in more detail, the loop reactor can include a circulating slurry or mixture of growing polymer particles in the carrier fluid. The loop reactor can be maintained at a pressure from about 120 kPa to about 5,500 kPa and at a temperature of about 60° C. to about 150° C., for example. Reaction heat can be removed and/or input through the loop wall. The loop wall can be in the form of a double-jacketed pipe. The slurry or mixture can be allowed to exit the reactor at regular intervals or continuously to one or more systems, devices, and/or combination of systems and/or devices capable of separating the polymer particles from the carrier fluid. At least a portion of the carrier fluid can be recycled back to the loop reactor. Additionally, any non polymerized monomer component can be recycled back to the loop reactor. The loop reactor can be used to carry out the suspension and/or emulsion process as a single loop reactor, or two or more loop reactors in parallel and/or series configurations. For example, the loop reactor can include 1, 2, 3, 4, 5, 10, 20, or more loops operated in series and/or parallel. The reaction mixture can be introduced to one or more locations of any given loop reactor. The monomer component or separate compounds of the monomer component can be introduced to any given loop reactor at the same location or different locations with respect to one another. For example, the phenolic monomer and the catalyst can be introduced to a given loop reactor at a first location and the crosslinking compound can be introduced to the loop reactor at a second location, where the first and second locations are at the same location on the reactor or where first and second locations are at different locations on the reactor.

In one or more embodiments, if the polymer particles in gel form are produced within the loop reactor (or any other reactor), polymer particles can be removed during, as, and/or within a relatively short time period after being produced, but prior to full cure thereof. For example, the polymer particles can be formed in a few minutes and/or after several minutes or even hours, where the polymer particles have sufficient integrity so that they do not or substantially do not "stick" or "glue" together with one another, but are not fully cured. The separated polymer particles can be introduced to a second vessel, container, or other system, device, and/or combination thereof, where the polymer particles can be further cured. The formation of the polymer particles within the loop reactor can be carried out in a first carrier fluid and when the polymer particles are removed from the loop reactor they can be kept in the first carrier fluid and/or separated from the first carrier fluid and combined with a second carrier fluid. For example, the carrier fluid in the loop reactor (first carrier fluid) can be or include one or more hydrocarbons and the carrier fluid in the second container (second carrier fluid) can be water. The separated first carrier fluid and/or at least a portion of any non-polymerized monomer can be recycled back to the reactor. Accordingly, the formation of the polymer particles in gel form can be carried out in a single vessel or reactor or a plurality of reactors or vessels. Additionally, the formation of the polymer particles in gel form can include the use or combination of different process conditions, e.g., temperature and/or pressure, polymer particle concentration in the carrier fluid (loop reactor as compared to the second vessel), and the like.

The suspension/emulsion process when utilizing liquid components generally can be carried out at a pressure from about 101 kPa to about 5,500 kPa or even greater. The suspension/emulsion process can also be carried out at a temperature from a low of about 0° C., about 20° C., about 40° C., or about 50° C. to a high of about 70° C., about 80° C., about 90° C., about 100° C., about 120° C., or about 150° C. Increasing the temperature can reduce the time required to polymerize and/or cure the monomer component to a desired amount. In the suspension/emulsion process particulate polymer can be formed in the carrier fluid.

Depending, at least in part, on the temperature at which the suspension and/or emulsion polymerization is carried out, the phenolic monomer, aldehyde monomer, and/or prepolymer can polymerize and/or cure in a time from about 30 seconds to several hours. For example, the monomer mixture can be polymerized and/or cured in a time from a low of about 1 minute, about 2 minutes, about 3 minutes, about 4 minutes, about 5 minutes, about 10 minutes, about 15 minutes, or about 20 minutes to a high of about 40 minutes, about 1 hour, about 1.5 hours, about 2 hours, about 3 hours, about 4 hours, about 5 hours, about 10 hours, about 15 hours, about 20 hours, or about 24 hours.

The particular mixer and/or reactor design or configuration can also be used, at least in part, as one variable that can be controlled or adjusted to influence the size and/or morphology of the polymer particles in gel form. For example, a reactor within which the suspension and/or emulsion polymerization be carried out in can be or include "rifled" piping or conduits that can be adapted or configured to increase, decrease, and/or maintain a velocity of the suspension and/or emulsion flowing through and across a cross-section of the piping or conduit. The mixer and/or reactor can include zigzag piping or conduits adapted or configured to increase, decrease, and/or maintain a velocity of the suspension and/or emulsion across and/or through a cross-section of the piping or conduit.

The temperature of the suspension and/or emulsion during the suspension and/or emulsion polymerization can be controlled, adjusted, or otherwise maintained using any one or more processes. For example, heating and/or cooling coils, exchangers, elements and the like can be used to control the temperature of the suspension and/or emulsion. In another example, steam, e.g., superheated steam, or other heated fluids can be injected into, directed toward, or otherwise used to heat the suspension and/or emulsion. In another example, an ultrasonic process heat can be directed toward the suspension and/or emulsion to polymerize the monomer component therein. In still another example, the suspension and/or emulsion can be subjected to a melt spinning process to produce the polymer particles in gel form. In still another example, the suspension and/or emulsion can be subjected to an extrusion process, e.g., an extrusion process similar to fiber production, to produce the polymer particles in gel form. In yet another example, the suspension and/or emulsion can be subjected to a Pastillation process to produce the polymer particles in gel form. In yet another example, the suspension and/or emulsion can be subjected to a drum, oven, grinding "DOG" process with injection molds instead of drums to increase the rate of heat transfer.

One or more fluids, e.g., liquid and/or gas, can be injected into the suspension and/or emulsion during the polymerization of the monomer component. For example, carbon dioxide can be directed or otherwise introduced into the suspension and/or emulsion during polymerization to direct, control, or otherwise adjust the structural development of the polymer particles in gel form. The one or more fluids can also be directed or otherwise introduced to the prepolymer during formation thereof and/or after formation of the prepolymer.

In one or more embodiments, the polymer particles in gel form can contain little or no metal ions, e.g., sodium, iron, lithium, phosphorus, aluminum, arsenic, boron, potassium, or any combination or mixture thereof. Impurities such as metal atoms and/or metal ions can be introduced to the polymer particles in gel form via any one or more of several possible sources, which can include, but are not limited to, the particular type of catalyst, leaching from the mixer and/or reactor into the monomer component and/or during and/or after the polymer particles in gel form are made. Accordingly, the materials used to make the mixer, line the inner surfaces or walls of the mixer, and/or components thereof, e.g., agitator blades, reactor, and the like can be chosen so as to reduce the potential or likelihood of contamination. For example, depending on a particular metal, the metal can leach or otherwise loose metal ions that can be incorporated into the polymer particle in gel form during the suspension and/or emulsion polymerization thereof.

The polymer particles in gel form can have a concentration of one or more metal atoms, one or more metal ions, or a combination or mixture of one or more metal atoms and one or more metal ions of less than about 1 wt %, less than about 0.5 wt %, less than about 0.3 wt %, less than about 0.2 wt %, less than about 0.1 wt %, less than about 0.7 wt %, less than about 0.05 wt %, less than about 0.3 wt %, less than about 0.01 wt %, less than about 0.007 wt %, less than about 0.005 wt %, less than about 0.003 wt %, less than about 0.001 wt %, less than about 0.0007 wt %, or less than about 0.0005 wt %, based on a total weight of the polymer particle in gel form. Similarly, the aerogel, xerogel, and/or cryogel particles can have a concentration of one or more metal atoms, one or more metal ions, or a combination or mixture of one or more metal atoms and one or more metal ions of less than about 1 wt %, less than about 0.5 wt %, less than about 0.3 wt %, less than about 0.2 wt %, less than about 0.1 wt %, less than about 0.7 wt %, less than about 0.05 wt %, less than about 0.3 wt %, less than about 0.01 wt %, less than about 0.007 wt %, less than about 0.005 wt %, less than about 0.003 wt %, less than about 0.001 wt %, less than about 0.0007 wt %, or less than about 0.0005 wt %, based on a total weight of the aerogel, xerogel, or cryogel particle.

One way to reduce and/or eliminate contamination of metal or metal ions within the polymer particles in gel form and/or the aerogel, xerogel, or cryogel particles can be to construct the mixer and/or reactor from non-reactive or very low reactive materials, materials having a reduced or less tendency to leach or give up metal atoms or ions to the reaction mixture as compared to materials that are known to leach metal atoms into the reaction mixture. Some potential materials that can be suitable for making the mixer and/or reactor used to produce the polymer particle in gel form that can also help reduce the contamination of metal ions leaching or otherwise transferring from the mixer and/or reactor to the polymer particles in gel form can include, but are not limited to, metals, glass, e.g., a glass lined vessel, fiber reinforced vessels, e.g., FRP (FRB, FRVE, FRSVE) and Dual laminate like PP/FRP, PVC/FRP, CPVC/FRP, PVDF/FRP, ECTFE/FRP, ETFE/FRP, FEP/FRP and PFA/FRP, polymer reactors, e.g., Teflon, polyethylene (PE), polypropylene (PP), Chlorinated Poly(Vinyl Chloride) (CPVC). Illustrative metals can include, but are not limited to, cobalt, chromium, tungsten, carbon, silicon, iron, manganese, molybdenum, vanadium, nickel, boron, phosphorous, sulfur, titanium, aluminum, copper, tungsten, alloys thereof, or any combination or mixture thereof. For example, the one or more inner surfaces of the reactor can be made of steel such as stainless steels, carbon steels, tool steels, alloy steels, or any combination or mixture thereof. Illustrative steels can include, but are not limited to, A387 Grade 11 low chrome steel, 304 stainless steel, and 347 stainless steel.

In one or more embodiments, the surfaces of the mixer and/or reactor and/or components thereof can be treated to reduce the likelihood of metal ions (or other impurities) from leaching or otherwise transferring from the surfaces to the polymer particle in gel form. The inner metal surfaces can be subjected a passivation process to reduce the likelihood of contamination of the polymer particles in gel form with metal ions. For example, metal surfaces of the mixer and/or reactor that contact the suspension and/or emulsion can be subjected one or more treatment processes such as carburization, boronization, and/or nitridization. In another example the inner surfaces of the mixer and/or reactor can be subjected to a pickling process.

In one or more embodiments, the mixer and/or reactor or inner surfaces thereof can be heated in the presence of a carbon source to a temperature below the melting point of the inner surfaces, but sufficiently high to cause carbon to deposit within the outer layer or surface of the inner surfaces, i.e., the layer or surface exposed to the reaction mixture. Any suitable form of carbon can be used as the carbon source, for example carbon containing gases, liquids, solids, and/or plasmas. Illustrative gases can include, but are not limited to, carbon dioxide, methane, ethane, propane, or the like. In another example, the mixer and/or reactor or/or inner surfaces thereof can be heated in the presence of a boron source to a sufficient temperature, but below the melting point of the inner surfaces, but sufficiently high to cause boron to diffuse into the surface and form borides with the material. In yet another example, the mixer and/or reactor and/or inner surfaces thereof can be heated in the presence of a nitrogen source to a sufficient temperature, but below the melting point of the inner surfaces, causing nitrogen to diffuse into the surface and form nitrides with the material. Any suitable process can be used to nitride the inner surfaces of the mixer and/or reactor and/or other components thereof. For example, gas nitriding, liquid or salt bath nitriding, and ion or plasma nitriding can be used. In another example, the mixer and/or reactor, and/or inner surfaces thereof can under-go both carburization and nitridization ("carbonitriding") in which both carbon and nitrogen are diffused into the inner surfaces thereof. Subjecting the mixer and/or reactor and/or other components and/or inner surfaces thereof to carburization, boronization, and/or nitridization can reduce or eliminate the likelihood that metal ions or other contaminants from the mixer and/or reactor and/or other components thereof can leach or otherwise transfer therefrom to the monomer component, the suspension and/or emulsion, and/or the polymer particles in gel form.

Any two or more components of the suspension and/or emulsion, i.e., the carrier fluid, the catalyst, the first monomer component, second monomer component, and/or the prepolymer can be directed or otherwise introduced to the mixer via a stream or pour addition. Any two or more components of the suspension and/or emulsion can be combined with one another via a spray or mist. Any two or more components of the suspension and/or emulsion can be combined with one another via a peristaltic pump. Any two or more components of the suspension and/or emulsion can be combined with one another via subsurface addition. For example, the carrier fluid can be added to the mixer and the monomer component can be directed, added, combined, or otherwise introduced to the carrier fluid in the mixture through one or more ports, nozzles, distribution grids, or the like disposed below a surface of the carrier fluid, above the surface of the carrier fluid, or a combination thereof.

The suspension and/or emulsion polymerization of the monomer component can be carried out in the presence of one or more filler materials. In other words, the suspension and/or emulsion can include one or more filler materials. The filler material can be combined with the phenolic monomer, the aldehyde monomer, the prepolymer, the carrier fluid, or any combination or mixture thereof. The filler material can be or include solid particles, hollow particles, porous particles, or any combination thereof. Illustrative filler materials can include, but are not limited to, naturally occurring organic filler material such as pecan shells, inorganic oxides, inorganic carbides, inorganic nitrides, inorganic hydroxides, inorganic oxides having hydroxide coatings, inorganic carbonitrides, inorganic oxynitrides, inorganic borides, inorganic borocarbides, or any combination or mixture thereof. Material suitable for use as a filler material can include those discussed and described in U.S. Patent Application Publication Nos. 2006/0078682 and 2008/0277115. The filler material can be coated with the polymer in gel form to produce polymer particles in gel form having a core of the filler material and an outer layer of the gel disposed thereon. The particles in gel form can include a single filler component or filler particle or a plurality of filler components or filler particles. For example, the particles in gel form can include anywhere form about 1 discrete filler component to about 10, about 20, about 30, about 40, about 50, about 60, about 70, about 80, about 90, about 100, about 150, about 200, about 250, about 500, about 1,000, about 1,500, about 2,000, about 10,000, about 20,000 or more discrete filler components. The size of the filler component can, at least in part, dictate the number of particular filler component particles within any given polymer particle in gel form.

The suspension and/or emulsion polymerization of the monomer in the second reaction mixture can be carried out in the presence of one or more tetra alkyl orthosilicates other orthosilicates to increase the yield, the crosslink density, and/or strength of the polymer particle in gel form. Illustrative tetra alkyl orthosilicates can include, but are not limited to, tetraethyl orthosilicate, tetramethyl orthosilicate (TMOS), or a combination or mixture thereof.

In one or more embodiments, one or more surfactants can be added to the suspension and/or emulsion of the second reaction mixture if so desired. For example, non-ionic surfactants such as nonylphenol ethoxylates and/or tall oil fatty acid glycerol esters ("TOFA-glycerol esters") can be used. Suitable commercially available surfactants can include, but are not limited to, Span 80, Triton X-100, Lecithin P123, CTAB, and the like. The amount of the surfactant can be from a low of about 0.3 wt %, about 0.5 wt %, about 0.7 wt %, about 1 wt %, or about 1.5 wt % to a high of about 2 wt %, about 3 wt %, about 5 wt %, about 10 wt %, or about 15 wt %, for example.

It should be noted that suspension and/or emulsion polymerization process used to produce the polymer particles in gel form can be conducted or carried out without the use of or in the substantial absence of any surfactant. Illustrative surfactants that can be absent from the suspension and/or emulsion or dispersion polymerization process include, but are not limited to, Span 80, Triton X-100, Lecithin P123, CTAB, and the like. The carrier fluid can be free or substantially free from any surfactant. The suspension and/or emulsion that includes the reaction mixture can also be free or substantially free from any surfactant. As used herein, the term "substantially free of any surfactant," when used with reference to the carrier fluid, refers to a carrier fluid that contains surfactant in an amount less than about 1 wt %, less than about 0.5 wt %, less than about 0.3 wt %, less than about 0.2 wt %, less than about 0.1 wt %, less than about 0.7 wt %, less than about 0.05 wt %, less than about 0.3 wt %, less than about 0.01 wt %, less than about 0.007 wt %, less than about 0.005 wt %, less than about 0.003 wt %, less than about 0.001 wt %, less than about 0.0007 wt %, or less than about 0.0005 wt %, based on the total weight of the carrier fluid. As used herein, the term "substantially free of any surfactant," when used with reference to the suspension and/or an emulsion, refers to a suspension and/or emulsion that contains surfactant in an amount less than about 1 wt %, less than about 0.5 wt %, less than about 0.3 wt %, less than about 0.2 wt %, less than about 0.1 wt %, less than about 0.7 wt %, less than about 0.05 wt %, less than about 0.3 wt %, less than about 0.01 wt %, less than about 0.007 wt %, less than about 0.005 wt %, less than about 0.003 wt %, less than about 0.001 wt %, less than about 0.0007 wt %, or less than about 0.0005 wt %, based on the total weight of the suspension and/or emulsion.

It should also be noted that the phenolic monomer, the aldehyde monomer, and/or the prepolymer, or a combination or mixture thereof can further include one or more other additives. Illustrative additives can include, but are not limited to, sulfur, carbon black, antioxidants, zinc oxide, accelerators, cellulose, filler, rheology modifiers, thickeners, wetting agents, colorants, lubricants, leveling agents, UV stabilizers, plasticizers, silica, processing oils, softening oils, bloating agents, or any combination thereof.

As an alternative to the suspension and/or emulsion polymerization methods discussed and described herein one or more alternative polymerizations processes can be used to produce the polymer particles in gel form and/or in a non-gel form. For example, one alternative processes, can include, but is not limited to, gas phase polymerization in which the monomer component is initially in the gaseous phase and the polymer particles form within the fluidized or gaseous medium.

In one or more embodiments, the molar ratio of the one or more phenolic monomers to the one or more aldehyde monomers of the polymer particles in gel form can be from a low of about 0.1:1 to a high of about 1.5:1. For example, the molar ratio of the one or more phenolic monomers to the one or more aldehyde monomers can be about 0.2:1 to about 1.4:1, about 0.8:1 to about 1.3:1, about 0.2:1 to about 0.9:1, about 0.3:1 to about 0.8:1, about 0.4:1 to about 0.8:1, about 0.4:1 to about 0.7:1, or about 0.4:1 to about 0.6:1. In at least one example, the molar ratio of the one or more phenolic monomer to the one or more aldehyde monomer can be about 0.4:1, about 0.5:1, about 0.6:1, about 0.7:1, about 0.8:1, about 0.9:1, or about 1:1.

The polymer particles in gel form can have an average cross-sectional length of about 0.1 mm or more, about 0.5 mm or more, about 1 mm or more, about 1.5 mm or more, about 2 mm or more, about 2.5 mm or more, about 3 mm or more, about 3.5 mm or more, about 4 mm or more, about 4.5 mm or more, about 5 mm or more, about 5.5 mm or more, or about 6 mm or more. The polymer particles in gel form can have a particle size distribution, i.e., the average cross-sectional length for any two polymer particles in gel form can vary. For example, about 10%, about 20%, about 30%, about 40%, about 50%, about 60%, about 70%, about 80%, about 90%, about 95%, or about 100% of the polymer particles in gel form can have an average cross-sectional length greater than or equal to 1 mm. In another example, about 10%, about 20%, about 30%, about 40%, about 50%, about 60%, about 70%, about 80%, about 90%, about 95%, or about 100% of the polymer particles in gel form can have an average cross-sectional length greater than or equal to 1.1 mm. In another example, about 10%, about 20%, about 30%, about 40%, about 50%, about 60%, about 70%, about 80%, about 90%, about 95%, or about 100% of the polymer particles in gel form can have an average cross-sectional length greater than or equal to 1.2 mm. In another example, about 10%, about 20%, about 30%, about 40%, about 50%, about 60%, about 70%, about 80%, about 90%, about 95%, or about 100% of the polymer particles in gel form can have an average cross-sectional length greater than or equal to 1.3 mm. In another example, about 10%, about 20%, about 30%, about 40%, about 50%, about 60%, about 70%, about 80%, about 90%, about 95%, or about 100% of the polymer particles in gel form can have an average cross-sectional length greater than or equal to 1.5 mm. In another example, about 10%, about 20%, about 30%, about 40%, about 50%, about 60%, about 70%, about 80%, about 90%, about 95%, or about 100% of the polymer particles in gel form can have an average cross-sectional length greater than or equal to 1.7 mm. In another example, about 10%, about 20%, about 30%, about 40%, about 50%, about 60%, about 70%, about 80%, about 90%, about 95%, or about 100% of the polymer particles in gel form can have an average cross-sectional length greater than or equal to 2 mm. In still another example, about 10%, about 20%, about 30%, about 40%, about 50%, about 60%, about 70%, about 80%, about 90%, about 95%, or about 100% of the polymer particles in gel form can have an average cross-sectional length greater than or equal to about 1 mm, about 1.2 mm, about 1.4 mm, about 1.6 mm, about 1.8 mm, about 2.1 mm, about 2.3 mm, or about 2.5 mm. In yet another example, about 10%, about 20%, about 30%, about 40%, about 50%, about 60%, about 70%, about 80%, about 90%, about 95%, or about 100% of the polymer particles in gel form have an average cross-sectional length greater than or equal to about 1 mm, about 1.5 mm, about 2 mm, about 2.5 mm, about 3 mm, about 3.5 mm, about 4 mm, about 4.5 mm, about 5 mm, or about 5.5 mm.

The polymer particles in gel form can have a surface area from a low of about 50 m$^2$/g, about 100 m$^2$/g, about 200 m$^2$/g, about 400 m$^2$/g, or about 500 m$^2$/g to a high of about 800 m$^2$/g, about 1,100 m$^2$/g, about 1,400 m$^2$/g, about 1,700 m$^2$/g, or about 2,000 m$^2$/g. For example, the surface area of the polymer particles in gel form can be from about 75 m$^2$/g to about 700 m$^2$/g, about 350 m$^2$/g to about 1,000 m$^2$/g, about 850 m$^2$/g to about 1,750 m$^2$/g, or about 600 m$^2$/g to about 1,300 m$^2$/g.

The polymer particles in gel form can have a pore size from a low of about 0.2 nm, about 0.5 nm, about 1 nm, about 5 nm, or about 10 nm to a high of about 100 nm, about 200 nm, about 300 nm, about 400 nm, or about 500 nm. For example, the pore size of the polymer particles in gel form can be from about 3 nm to about 75 nm, about 15 nm to about 150 nm, about 40 nm to about 450 nm, or about 20 nm to about 300 nm.

The pore size of the polymer particles in gel form can also be referred to as being microporous (less than or equal to 2 nm), mesoporous (from 2 nm to about 50 nm), or macroporous (greater than 50 nm). The polymer particles can have only a microporous pore size distribution, only a mesoporous pore size distribution, or only a macroporous pore size distribution. In another example, the polymer particles can have a combination of microporous pore size, mesoporous pore size, and/or macroporous pore size distribution.

The polymer particles in gel form can have a monomodal pore size distribution, a bimodal pore size distribution, or a multi-modal pore size distribution. In another example, the polymer particles can have only a monomodal pore size distribution, a bimodal pore size distribution, or a multi-modal pore size distribution.

The polymer particles in gel form can have a pore volume from a low of about 0.05 $cm^3/g$, about 0.1 $cm^3/g$, about 0.5 $cm^3/g$, about 1 $cm^3/g$, or about 1.5 $cm^3/g$ to a high of about 2 $cm^3/g$, about 2.5 $cm^3/g$, about 3 $cm^3/g$, about 3.5 $cm^3/g$, or about 4 $cm^3/g$. For example, the surface area of the polymer particles in gel form can be from about 0.05 $cm^3/g$ to about 1 $cm^3/g$, about 0.7 $cm^3/g$ to about 3.5 $cm^3/g$, about 0.5 $cm^3/g$ to about 3 $cm^3/g$, or about 2.5 $cm^3/g$ to about 4 $cm^3/g$.

The polymer particles in gel form can be separated from the carrier fluid to provide separated polymer particles in gel form. The polymer particles and the carrier fluid can be separated from one another using any suitable system, device, or combination of systems and/or devices. For example, the polymer particles in gel form can be separated from the carrier fluid using a solid bowl centrifuge, a decanter bowl centrifuge, a high speed disc bowl centrifuge, a decanter centrifuge, a cyclone, gravity or sedimentation, flotation, filtration, and the like, and combinations thereof.

The polymer particles in gel form can be further processed to produce aerogel, xerogel, and/or cryogel particles. The particular end product can depend, at least in part, on the particular process used to remove the liquid medium and/or carrier fluid from the polymer particles in gel form. For example, a process for converting the polymer particles in gel form to an aerogel can include supercritical extraction of the liquid medium and/or the carrier fluid. In another example, a process for converting the polymer particles in gel form to a xerogel can include air drying to remove the liquid medium and/or the carrier fluid. In another example, a process for converting the polymer particles in gel form to a cryogel can include freeze drying to remove the liquid medium and/or the carrier fluid.

In another specific embodiment, the method for making aerogel can include making a prepolymer from a first reaction mixture that includes phenol, resorcinol, formaldehyde, and a first catalyst. The first catalyst can include one or more amines and/or one or more metal catalyst. Illustrative first catalysts can include, but are not limited to ammonia, dimethylethanolamine (DMEA), ethylenediamine (EDA), triethylamine (TEA), hexamethylenetetramine (hexamine), and lithium carbonate, and any mixture thereof. The prepolymer can be combined with a carrier fluid and a second catalyst. The second catalyst can be or include one or more dicarboxylic acids, anhydrides, resorcinol, or any mixture thereof. As discussed above, illustrative second catalysts can include, but are not limited to maleic anhydride, maleic acid, phthalic anhydride, phthalic acid, resorcinol, any combination thereof, or any mixture thereof. For example, the second catalyst can include maleic anhydride, resorcinol, or a mixture thereof. The prepolymers can be polymerized within a reactor to form polymer particles in gel form. The polymer particles in gel form can be recovered from the reactor. A liquid medium in the polymer particles in gel form can be at least partially removed therefrom to produce the aerogel.

In one or more embodiments, the liquid and/or carrier fluid contained in and/or on the polymer particles in gel form can be replaced with a more volatile solvent via solvent exchange. For example, the polymer particles in gel form can be contacted with a hydrocarbon solvent, e.g., acetone, which can remove at least a portion of the liquid medium and/or the carrier fluid and with the hydrocarbon solvent. The hydrocarbon solvent can then be more readily removed from the polymer particles in gel form to provide substantially dry polymer particles via supercritical extraction, air drying, freeze drying, and the like. However, the polymer particles in gel form that contain the liquid and/or carrier fluid can also be dried via supercritical, air, or freeze drying.

Suitable processes for removing at least a portion of the liquid medium and/or carrier fluid from within and/or on the polymer particles in gel form can be as discussed and described in U.S. Patent Application Publication No. 2011/0028599.

The separated carrier fluid can be reused. For example, the separated carrier fluid can be recycled to the same or other mixer, reactor, or other vessel and to provide at least a portion of the carrier fluid therein. The separated carrier fluid can be subjected to a cleaning process, e.g., filtration, heating, screening, centrifugation, or the like, to remove at least a portion of any contaminants therein prior to reuse.

After removal of at least a portion of the liquid medium and the carrier fluid, the polymer particles or "dried polymer particles" can be subjected to a carbonization or pyrolysis process to remove at least a portion of the non-carbon components, i.e., hydrogen, oxygen, nitrogen, and other non-carbon atoms, from the dried polymer particles. The resulting carbonized or pyrolyzed particles contain primarily carbon. Any pyrolyzation or carbonization process can be used. In one example, the dried polymer aerogel, xerogel, and/or cryogel particles can be placed into a rotary kiln and heated therein. The pyrolysis process can be carried out under an inert atmospheres, e.g., a nitrogen, argon, or other inert gas or gas mixture. Pyrolysis processes are well known to those of skill in the art.

The duration of the pyrolysis, i.e., the period of time during which the polymer particles are maintained at the elevated temperature can be from about 30 seconds to about 10 hours, about 1 minute to about 5 hours, about 5 minutes to about 2 hours, about 10 minutes to about 1 hour, or about 20 minutes to about 45 minutes. The pyrolysis dwell temperature can be from about 600° C. to about 1,800° C., about 600° C. to about 1,200° C., or about 650° C. to about 1,100° C.

The pyrolyzed particulates can be activated. Activating the pyrolyzed particulates can include any activation process or combination of activation processes known to those skilled in the art. The activation time and/or activation temperature can affect the performance of the resulting activated carbon material, as well as the manufacturing cost thereof. For example, increasing the activation temperature and the activation dwell time can yield higher activation percentage of the particulates, but can also correspond to the removal of more material compared to lower temperatures and shorter dwell times. As such, higher activation can increase performance of the final activated carbon, but it can also increase the cost of the process by reducing the overall carbonized product.

Pyrolyzed polymer aerogels, xerogels, and/or cryogels can be activated by contacting the pyrolyzed polymer gel with an activating agent. Illustrative activating agents can be or include gases such as carbon dioxide, steam, oxygen, or any combination or mixture thereof. Other activating agents can include other compounds or chemicals.

The activation process can be from about 1 minute to about 2 days, about 5 minutes to about 1 day, about 1 minute to about 18 hours, about 1 minute to about 12 hours, about 5 minutes to about 8 hours, about 1 minute to about 10 minutes, or about 1 hour to about 5 hours.

In one example of an activation process, the pyrolyzed aerogel, xerogel, and/or cryogel particles can be weighed and placed in a rotary kiln and an automated gas control manifold and controller can be set to ramp rate of about 20° C. per minute. Carbon dioxide can be introduced to the kiln environment for a period of time once the proper activation temperature has been reached. After activation has occurred, the carbon dioxide can be replaced by nitrogen and the kiln can be cooled down. The recovered activated particles can be weighed at the end of the process to assess the level of activation. Other activation processes are well known to those of skill in the art. Suitable activation temperatures can be from about 800° C. to about 1,300° C., about 900° C. to about 1,050° C., or about 900° C. to about 1,000° c. One skilled in the art will recognize that other activation temperatures, either lower or higher, may be employed.

The degree of activation can be measured in terms of the mass percent of the pyrolyzed cryogel that is lost during the activation step. The degree of activation can be from a low of about 1%, about 5%, about 10%, about 20%, about 30%, about 40%, or about 50% to a high of about 60%, about 70%, about 80%, about 90%, about 95%, or about 99%.

The polymer particles after drying, after pyrolyzing, and/or after activation can have an average cross-sectional length of about 0.1 mm or more, about 0.5 mm or more, about 1 mm or more, about 1.5 mm or more, about 2 mm or more, about 2.5 mm or more, about 3 mm or more, about 3.5 mm or more, about 4 mm or more, about 4.5 mm or more, about 5 mm or more, about 5.5 mm or more, or about 6 mm or more. T The polymer particles after drying, after pyrolyzing, and/or after activation can have a particle size distribution, i.e., the average cross-sectional length for any two polymer particles form can vary. For example, about 10%, about 20%, about 30%, about 40%, about 50%, about 60%, about 70%, about 80%, about 90%, about 95%, or about 100% of the polymer particles after drying, after pyrolyzing, and/or after activation can have an average cross-sectional length greater than or equal to 1 mm. In another example, about 10%, about 20%, about 30%, about 40%, about 50%, about 60%, about 70%, about 80%, about 90%, about 95%, or about 100% of the polymer particles after drying, after pyrolyzing, and/or after activation can have an average cross-sectional length greater than or equal to 1.1 mm. In another example, about 10%, about 20%, about 30%, about 40%, about 50%, about 60%, about 70%, about 80%, about 90%, about 95%, or about 100% of the polymer particles after drying, after pyrolyzing, and/or after activation can have an average cross-sectional length greater than or equal to 1.2. In another example, about 10%, about 20%, about 30%, about 40%, about 50%, about 60%, about 70%, about 80%, about 90%, about 95%, or about 100% of the polymer particles after drying, after pyrolyzing, and/or after activation can have an average cross-sectional length greater than or equal to 1.3. In another example, about 10%, about 20%, about 30%, about 40%, about 50%, about 60%, about 70%, about 80%, about 90%, about 95%, or about 100% of the polymer particles after drying, after pyrolyzing, and/or after activation can have an average cross-sectional length greater than or equal to 1.5 mm. In another example, about 10%, about 20%, about 30%, about 40%, about 50%, about 60%, about 70%, about 80%, about 90%, about 95%, or about 100% of the polymer particles after drying, after pyrolyzing, and/or after activation can have an average cross-sectional length greater than or equal to 1.7. In another example, about 10%, about 20%, about 30%, about 40%, about 50%, about 60%, about 70%, about 80%, about 90%, about 95%, or about 100% of the polymer particles after drying, after pyrolyzing, and/or after activation can have an average cross-sectional length greater than or equal to 2 mm. In still another example, about 10%, about 20%, about 30%, about 40%, about 50%, about 60%, about 70%, about 80%, about 90%, about 95%, or about 100% of the polymer particles after drying, after pyrolyzing, and/or after activation can have an average cross-sectional length greater than or equal to about 1 mm, about 1.2 mm, about 1.4 mm, about 1.6 mm, about 1.8 mm, about 2.1 mm, about 2.3 mm, or about 2.5 mm. In yet another example, about 10%, about 20%, about 30%, about 40%, about 50%, about 60%, about 70%, about 80%, about 90%, about 95%, or about 100% of the polymer particles after drying, after pyrolyzing, and/or after activation can have an average cross-sectional length greater than or equal to about 1 mm, about 1.5 mm, about 2 mm, about 2.5 mm, about 3 mm, about 3.5 mm, about 4 mm, about 4.5 mm, about 5 mm, or about 5.5 mm.

The polymer particles after drying, after pyrolyzing, and/or after activation can have a surface area from a low of about 100 m$^2$/g, about 400 m$^2$/g, about 800 m$^2$/g, about 1,000 m$^2$/g, or about 1,200 m$^2$/g to a high of about 2,000 m$^2$/g, about 2,500 m$^2$/g, about 3,000 m$^2$/g, about 3,500 m$^2$/g, or about 4,000 m$^2$/g. For example, the polymer particles after drying, after pyrolyzing, and/or after activation form can be from about 100 m$^2$/g to about 500 m$^2$/g, about 300 m$^2$/g to about 1,400 m$^2$/g, about 700 m$^2$/g to about 2,800 m$^2$/g, or about 1,600 m$^2$/g to about 3,800 m$^2$/g.

The polymer particles after drying, after pyrolyzing, and/or after activation can have a pore size from a low of about 0.2 nm, about 0.5 nm, about 1 nm, about 5 nm, or about 10 nm to a high of about 100 nm, about 200 nm, about 300 nm, about 400 nm, or about 500 nm. For example, the polymer particles after drying, after pyrolyzing, and/or after activation can be from about 3 nm to about 75 nm, about 15 nm to about 150 nm, about 40 nm to about 450 nm, or about 20 nm to about 300 nm.

The pore size of the polymer particles after drying, after pyrolyzing, and/or after activation can also be referred to as being microporous (less than or equal to 2 nm), mesoporous (from 2 nm to about 50 nm), or macroporous (greater than 50 nm). The polymer particles after drying, after pyrolyzing, and/or after activation can have only a microporous pore size distribution, only a mesoporous pore size distribution, or only a macroporous pore size distribution. In another example, the polymer particles after drying, after pyrolyzing, and/or after activation can have a combination of microporous pore size, mesoporous pore size, and/or macroporous pore size distribution.

The polymer particles after drying, after pyrolyzing, and/or after activation can have a monomodal pore size distribution, a bimodal pore size distribution, or a multi-modal pore size distribution. In another example, the polymer particles after drying, after pyrolyzing, and/or after activation can have only a monomodal pore size distribution, a bimodal pore size distribution, or a multi-modal pore size distribution.

The polymer particles after drying, after pyrolyzing, and/or after activation can have a pore volume from a low of about 0.05 cm$^3$/g, about 0.1 cm$^3$/g, about 0.5 cm$^3$/g, about 1 cm$^3$/g, or about 1.5 cm$^3$/g to a high of about 2 cm$^3$/g, about 2.5 cm$^3$/g, about 3 cm$^3$/g, about 3.5 cm$^3$/g, or about 4 cm$^3$/g. For example, the pore volume of the polymer particles after drying, after pyrolyzing, and/or after activation can be from about 0.05 cm$^3$/g to about 1 cm$^3$/g, about 0.7 cm$^3$/g to about 3.5 cm$^3$/g, about 0.5 cm$^3$/g to about 3 cm$^3$/g, or about 2.5 cm$^3$/g to about 4 cm$^3$/g.

The polymer particles after drying, after pyrolyzing, and/or after activation can have a real density from a low of about 0.05 g/cm$^3$, about 0.1 g/cm$^3$, about 0.2 g/cm$^3$, about 0.4 g/cm$^3$, or about 0.6 g/cm$^3$ to a high of about 0.9 g/cm$^3$, about 1 g/cm$^3$, about 1.2 g/cm$^3$, about 1.3 g/cm$^3$, about 1.6 g/cm$^3$, or about 1.8 g/cm$^3$. For example, the polymer particles after drying, after pyrolyzing, and/or after activation can have a real density of about 0.05 g/cm$^3$ to about 1 g/cm$^3$, about 0.5 g/cm$^3$ to about 1.8 g/cm$^3$, about 0.8 g/cm$^3$ to about 1.6 g/cm$^3$, or about 0.3 g/cm$^3$ to about 1.7 g/cm$^3$.

Metal ions can also be intentionally doped or added to the reaction mixture, the monomer component, the carrier fluid, the polymer particles in gel form, dried polymer particles produced by removing at least a portion of any of the liquid from the particles in gel form, the suspension and/or emulsion, or any combination thereof. For example, metal doped hydrocarbons such as metal doped furfural can be combined with the monomer component and/or the suspension and/or emulsion to add metals to the polymer particles in gel form and/or increase carbon yield.

Nitrogen can also be intentionally doped or added to the reaction mixture, the monomer component, the carrier fluid, the polymer particles in gel form, dried polymer particles produced by removing at least a portion of any of the liquid from the particles in gel form, the suspension and/or emulsion, or any combination thereof. For example, nitrogen-rich compounds can be combined with the monomer component and/or the suspension and/or emulsion to add nitrogen to the polymer particles in gel form. Adding or increasing the concentration of nitrogen in the polymer particles in gel form and/or dried form can improve the capacitance of one or more end products, e.g., carbonized particles. Illustrative nitrogen sources can include, but are not limited to, urea, melamine, nitric acid, or any combination or mixture thereof.

Depending, at least in part, on the end use of the polymer particles in gel form, the polymer particles may be used in the gel form, after drying, after pyrolyzing, after activation, or a combination of particles in the gel form, dried, pyrolyzed, and/or activated can be used in an application. Illustrative applications that can use the polymer particles in gel form, dried, pyrolyzed, and/or activated can include, but are not limited to, insulation, energy, e.g., in capacitors, batteries, and fuel cells, medicine, e.g., drug delivery, transportation, e.g., hydrogen or other fuel storage, sensors, sports, catalysts, hazardous waste water treatment, catalyst supports, sorbents, dielectrics, impedance matcher, detectors, filtrations, ion exchange, high-energy physics applications, waste management, such as adsorption of waste fluids and/or waste gases, and the like.

EXAMPLES

In order to provide a better understanding of the foregoing discussion, the following non-limiting examples are offered. Although the examples may be directed to specific embodiments, they are not to be viewed as limiting the invention in any specific respect. All parts, proportions, and percentages are by weight unless otherwise indicated.

Example I

Phenol (519.9 g) and formaldehyde (464.5 g) were added to a reactor. The reaction mixture was heated to 55° C. Triethylamine (15.6 g) was added slowly to the reactor over 30 minutes. The reaction mixture was then heated to 78° C. for 45 minutes. The reaction mixture was held at 78° C. until the Oswaldt viscosity reached 60 centistokes. The reaction mixture was cooled to 55° C. The reaction mixture was then distilled to a water content of 13% and a viscosity of 650 centipoise (cP). The resulting prepolymer was cooled to 25° C. and placed into collection bottles. 1.7 wt % of resorcinol based on the weight of the prepolymer and 1.7 wt % of maleic anhydride based on the weight of the prepolymer were added to the prepolymer. The prepolymer was stored in a cold room at a temperature of 5° C. for overnight.

The next day Flint Hills base oil (100 g) was added to a 500 mL glass beaker. The oil was stirred with a magnetic stir bar and heated to 95° C. on a hot plate (Corning PC-351). The prepolymer (30 g) was added slowly to the heated oil. The base oil/prepolymer mixture was maintained at a temperature above 90° C. The base oil/prepolymer mixture was stirred for 2 hours in a temperature range of 90° C. to 98° C. The base oil/prepolymer mixture was cooled and transferred into 250 mL bottles and placed in an oven heated to 95° C. to further cure the prepolymer into polymer particles in gel form. After 24 hours the bottles were removed from the oven and the polymer particles were collected. The polymer particles in gel form had a cross-sectional length of about 1 mm.

Example II

Phenol (447.1 g) and formaldehyde (399.5 g) were added to a reactor. The reaction mixture was heated to 55° C. Dimethylethanolamine (13.5 g) was added slowly to the reactor over 15 minutes. The reaction mixture was heated to 77° C. over 30 minutes. The reaction mixture was held at 77° C. for 15 minutes and then heated to 90° C. for 25 minutes until the Car-Hol viscosity reached 125 cP. The reaction mixture was cool to 55° C. The reaction mixture was then distilled to a water content of 8.25% and a refractive index (RI) of 1.5900. The reaction mixture was heated to reflux and ethylene glycol (75.8 g) was added. The reaction mixture was then cooled to 25° C. A mixture of 70 wt % methane sulfonic acid (8.1 g) and ethylene glycol (56.0 g) was added to the reaction mixture. A mixture of 70 wt % methane sulfonic acid (454 g) and 908 g of water (908 g) was added to the reaction mixture. The pH of the reaction mixture was adjusted to 7. Water was added to the resulting prepolymer to adjust the refractive index to 1.5560 and the viscosity to 1100 cP. The water content of the prepolymer was 8%. 1.7 wt % of resorcinol and 1.7 wt % of maleic anhydride, based on the weight of the prepolymer, were added to the prepolymer. The prepolymer was stored in a cold room at a temperature of 5° C. for overnight.

The next day Flint Hills base oil (100 g) was added to a 500 mL glass beaker. The oil was stirred via magnetic stir bar and heated to 95° C. on a hot plate (Corning PC-351). The prepolymer (30 g) was added slowly to the oil such that the temperature of the oil/prepolymer mixture maintained a temperature above 90° C. After adding the prepolymer, the contents of the reactor were stirred at a temperature between 90° C. and 98° C. for 2 hours. The contents of the beaker (oil/polymer particulates) were cooled and transferred to 250 mL bottles and placed in an oven heated to a temperature of 95° C.

for 24 hr. The bottles were removed from the oven and the polymer particles in gel form were collected. The polymer particles in gel form had a cross-sectional length of about 0.1-2.5 mm.

Example III

Phenol (443.7 g) and formaldehyde (543.6 g) were added to a reactor. The reaction mixture was heated to 55° C. Lithium carbonate (1.5 g) was added slowly to the reactor over 15 minutes. The reaction mixture was heated to 65° C. over 60 minutes. The reaction mixture was then heated to 80° C. over 30 minutes and held until the HPCT at 150° C. reached 110 and the Gar-Hol viscosity reached 80 cP. The reaction mixture was cooled to 55° C. A mixture of citric acid (4.0 g) and water (7.2 g) was made. The pH was adjusted to 4.65 using the citric acid solution. The reaction mixture was then distilled until the RI reached 1.5500 and the viscosity reached 600 cP. The nonvolatiles were adjusted to 74 at 125° C. and the viscosity adjusted to 600 cP with distilled water. 1.7 wt % resorcinol and 1.7 wt % maleic anhydride, based on the weight of the prepolymer, were added to the prepolymer. The mixture was then stored in a cold room at a temperature of about 5° C. overnight.

The next day about Flint Hills Base oil (100 g) was added to a 500 mL glass beaker. The oil was stirred via magnetic stir bar and heated to a temperature of about 95° C. on a hot plate (Corning PC-351). The prepolymer (30 g) was added slowly to the heated oil such that the temperature was maintained above 90° C. After adding the prepolymer, the contents of the reactor were stirred for 2 hours at a temperature between 90° C. to 98° C. The contents of the beaker (oil/polymer particulates) were cooled and transferred into about 250 mL bottles and placed in an oven (95° C.). After 24 hours the bottles were removed from the oven and the polymer particle product in gel form were collected. The polymer particles in gel form had a cross-sectional length of about 0.1-2.5 mm.

A Bellingham+Stanley Ltd RFM 330 refractometer was used to determine the refractive index of the prepolymers in all examples. The refractive index measurement procedure was as follows. Water at a temperature of about 25.0° C. was circulated into the refractometer 1 hr. before each refractive index (RI) measurement. The cleanliness of the prism was checked. If the RI reading of distilled water left from the previous RI measurement was not 1.3325+/−0.0001, the prism and presser were cleaned with distilled water, methanol, isopropyl alcohol, or other suitable solvent, and the prism was then refilled with distilled water. The presser was immediately closed and the RI measurement was taken. This step was repeated if necessary until the RI reading of distilled water read 1.3325±0.0001. The distilled water on the prism and the presser was wiped off after the refractometer was calibrated. The presser of the refractometer was lifted and the about 0.5 mL to about 1.0 ml of the sample was transferred to the prism with a plastic pipette. For an RI measurement, there must be sufficient sample transferred to the prism such that the entire prism area was covered with the sample. The sample was gently stirred in the prism with the pipet tip to break the surface tension. The presser was then closed and the RI measurement was taken. The temperature displayed by the refractometer was at 25° C.+/−±0.1° C. The preceding procedure was repeated until two successive readings equal to or within 0.0001 RI units were acquired and the average of those two successive readings are the RI values reported herein.

Embodiments of the present disclosure further relate to any one or more of the following paragraphs:

1. A method for making polymer particles in gel form via emulsion or suspension polymerization, the method comprising: reacting a first reaction mixture comprising a phenolic monomer, an aldehyde monomer, and a first catalyst to produce a prepolymer; combining the prepolymer with a carrier fluid and a second catalyst, wherein the second catalyst comprises a dicarboxylic acid, an anhydride, or a mixture thereof; and polymerizing the prepolymer to form polymer particles in gel form.

2. The method according to paragraph 1, wherein the second catalyst comprises maleic acid, maleic anhydride, or a mixture thereof.

3. The method according to any one of paragraph 1 or 2, wherein the phenolic monomer comprises phenol and resorcinol.

4. The method according to any one of paragraph 1 to 3, wherein about 40% or more of the polymer particles in gel form have an average cross-sectional length greater than or equal to 1 mm.

5. The method according to any one of paragraph 1 to 4, wherein the first catalyst is selected from the group consisting of ammonia, dimethylethanolamine, ethylenediamine, triethylamine, hexamethylenetetramine, lithium carbonate, or any mixture thereof.

6. The method according to any one of paragraph 1 to 5, wherein the carrier fluid is selected from a group consisting of mineral oil, vegetable oil, or any mixture thereof.

7. The method according to any one of paragraph 1 to 6, wherein the carrier fluid has a viscosity of about 0.5 cP to about 400 cP at a temperature of 25° C.

8. The method according to any one of paragraph 1 to 7, wherein the aldehyde monomer comprises formaldehyde.

9. The method according to any one of paragraph 1 to 8, wherein the prepolymer has a molar ratio of aldehyde monomer to phenolic monomer greater than about 1.3.

10. The method according to any one of paragraph 1 to 9, wherein the polymer particles have a molar ratio of phenol to resorcinol of about 50 to about 5.

11. The method according to any one of paragraph 1 to 10, wherein the emulsion or suspension polymerization is substantially free of a surfactant.

12. The method according to any one of paragraph 1 to 11, wherein about 50% or more of the polymer particles in gel form have an average cross-sectional length greater than or equal to 0.5 mm.

13. The method according to any one of paragraph 1 to 12, wherein the polymer particles in gel form are made via the emulsion process, and wherein the emulsion process is an inverse emulsion process.

14. A method for making polymer particles in gel form via emulsion or suspension polymerization, the method comprising: reacting a first mixture comprising phenol, resorcinol, and formaldehyde, in the presence of a first catalyst to produce a prepolymer; combining a carrier fluid and a second catalyst with the prepolymer to form an emulsion or a suspension, wherein the second catalyst is selected from a group consisting of maleic acid, maleic anhydride, or a mixture thereof; and polymerizing the prepolymer in the emulsion or suspension to produce polymer particles in gel form.

15. The method according to paragraph 14, wherein the first mixture is heated to a temperature of about 40° C. to about 100° C.

16. The method according to any one of paragraph 14 or 15, wherein the emulsion or suspension is heated to a temperature of about 40° C. to about 98° C.

17. The method according to any one of paragraph 14 to 16, wherein the first mixture further comprises an acid selected from the group consisting of acetic acid, formic acid, nitric acid, citric acid, methane sulfonic acid and any mixture thereof, and wherein the first reaction mixture has a pH of about 1 to about 5.

18. The method according to any one of paragraph 14 to 17, wherein the emulsion or suspension further comprises an acid selected from the group consisting of: acetic acid, formic acid, nitric acid, and any mixture thereof, and wherein the emulsion or suspension has a pH of about 1 to about 5.

19. A method for making an aerogel, comprising: making a prepolymer from a first reaction mixture comprising phenol, resorcinol, formaldehyde, and a first catalyst, wherein the first catalyst is selected from a group consisting of ammonia, dimethylethanolamine, ethylenediamine, triethylamine, hexamethylenetetramine, lithium carbonate, or any mixture thereof; combining the prepolymer with a carrier fluid and a second catalyst comprising dicarboxylic acids or anhydrides to form an emulsion or suspension; and polymerizing the prepolymers in the emulsion or suspension within a reactor to form polymer particles in gel form; recovering polymer particles in gel form from the reactor; and removing a liquid medium from the polymer particles in gel form to produce the aerogel.

20. The method according to paragraph 19, wherein the liquid medium is removed by a process selected from the group of supercritical extraction, freeze drying, and air drying.

21. A method for making polymer particles in gel form via emulsion or suspension polymerization, the method comprising: reacting a first reaction mixture comprising a phenolic monomer, an aldehyde monomer, and a first catalyst to produce a prepolymer; combining the prepolymer with a carrier fluid and a second catalyst to produce a second reaction mixture, wherein the second catalyst comprises a dicarboxylic acid, an anhydride, a dihydroxybenzene, or any mixture thereof; and polymerizing the prepolymer to form polymer particles in gel form.

22. The method according to paragraph 21, wherein the second catalyst comprises maleic anhydride, resorcinol, or a mixture thereof.

23. The method according to paragraph 21 or 22, wherein the phenolic monomer comprises phenol, a first dihydroxybenzene, or a mixture thereof, and wherein the second catalyst comprises maleic anhydride, a second dihydroxybenzene, or a mixture thereof.

24. The method according to paragraph 23, wherein the polymer particles in gel form have a molar ratio of phenol to the first dihydroxybenzene of about 50:1 to about 5:1.

25. The method according to any one of paragraphs 21 to 24, wherein about 50% or more of the polymer particles in gel form have an average cross-sectional length greater than or equal to 0.5 mm.

26. The method according to any one of paragraphs 21 to 25, wherein about 40% or more of the polymer particles in gel form have an average cross-sectional length greater than or equal to 1 mm.

27. The method according to any one of paragraphs 21 to 26, wherein the first catalyst comprises ammonia, dimethylethanolamine, ethylenediamine, triethylamine, trimethylamine, tripropylamine, diethylethanolamine, hexamethylenetetramine, lithium carbonate, or any mixture thereof.

28. The method according to any one of paragraphs 21 to 27, wherein the carrier fluid comprises mineral oil, vegetable oil, or a mixture thereof.

29. The method according to any one of paragraphs 21 to 28, wherein the carrier fluid has a viscosity of about 0.5 cP to about 400 cP at a temperature of 25° C.

30. The method according to any one of paragraphs 21 to 29, wherein the aldehyde monomer comprises formaldehyde.

31. The method according to any one of paragraphs 21 to 30, wherein the prepolymer has a molar ratio of the phenolic monomer to the aldehyde monomer of about 0.1:1 to about 1.5:1.

32. The method according to any one of paragraphs 21 to 31, wherein the emulsion or suspension polymerization is substantially free of a surfactant.

33. The according to any one of paragraphs 21 to 32, wherein the emulsion or suspension polymerization comprises less than 1 wt % of any surfactant, based on the total weight of the carrier fluid.

33. The method according to any one of paragraphs 21 to 32, wherein the polymer particles in gel form are made via the emulsion process, and wherein the emulsion process is an inverse emulsion process.

34. A method for making polymer particles in gel form via emulsion or suspension polymerization, the method comprising: reacting a first reaction mixture comprising a phenolic monomer and formaldehyde in the presence of a first catalyst to produce a prepolymer, wherein the phenolic monomer comprises phenol, resorcinol, or a mixture thereof; combining a carrier fluid and a second catalyst with the prepolymer to form an emulsion or a suspension, wherein the second catalyst comprises an anhydride, a dihydroxybenzene, or a mixture thereof; and polymerizing the prepolymer in the emulsion or suspension to produce polymer particles in gel form.

35. The method according to paragraph 34, wherein the first reaction mixture is reacted at a temperature of about 40° C. to about 200° C. to produce the prepolymer, and wherein the prepolymer is polymerized in the emulsion or suspension at a temperature of about 40° C. to about 200° C., and wherein the first catalyst comprises ammonia, dimethylethanolamine, ethylenediamine, triethylamine, trimethylamine, tripropylamine, diethylethanolamine, hexamethylenetetramine, lithium carbonate, or any mixture thereof.

36. The method according to paragraph 34 or 35, wherein the first reaction mixture further comprises acetic acid, formic acid, nitric acid, citric acid, methane sulfonic acid, or any mixture thereof, and wherein the first reaction mixture has a pH of about 1 to about 5.

37. The method according to any one of paragraphs 34 to 36, wherein the emulsion or suspension further comprises acetic acid, formic acid, nitric acid, citric acid, methane sulfonic acid, or any mixture thereof, and wherein the emulsion or suspension has a pH of about 1 to about 5.

38. A method for making an aerogel, comprising: making a prepolymer from a first reaction mixture comprising a phenolic monomer, formaldehyde, and a first catalyst, wherein the phenolic monomer comprises phenol, a first dihydroxybenzene, or a mixture thereof, and wherein the first catalyst comprises ammonia, dimethylethanolamine, ethylenediamine, triethylamine, trimethylamine, tripropylamine, diethylethanolamine, hexamethylenetetramine, lithium carbonate, or any mixture thereof; combining the prepolymer with a carrier fluid and a second catalyst comprising maleic anhydride, a second dihydroxybenzene, or a mixture a mixture thereof to form an emulsion or suspension; polymerizing the prepolymer in the emulsion or suspension to form polymer particles in gel form, wherein about 40% or more of the polymer particles in gel form have an average cross-sectional length greater than or equal to 1 mm; and drying the polymer particles in gel form to produce an aerogel.

39. The method according to paragraph 38, wherein the carrier fluid comprises mineral oil, vegetable oil, or a mixture thereof, wherein the prepolymer has a molar ratio of the phenolic monomer to the aldehyde monomer of about 0.1:1 to about 1.5:1, wherein the prepolymer is polymerized in the emulsion to form the polymer particles in gel form, and wherein the emulsion is an inverse emulsion.

40. The method according to paragraph 39, wherein the polymer particles in gel form are dried by supercritical extraction, freeze drying, air drying, or any combination thereof.

41. The method according to any one of paragraphs 1 to 40, wherein a concentration of the phenolic monomer is about 5 wt % to about 50 wt %, based on the total weight of the carrier fluid, the phenolic monomer, the aldehyde monomer, the first catalyst and, the second catalyst.

42. The method according to any one of paragraphs 1 to 41, wherein a concentration of the aldehyde monomer is about 3 wt % to about 70 wt %, based on the total weight of the carrier fluid, the phenolic monomer, the aldehyde monomer, the first catalyst, and the second catalyst.

43. The method according to any one of paragraphs 1 to 42, wherein a concentration of the first catalyst in the first reaction mixture is about 1 wt % to about 30 wt %, based on the weight of the phenolic monomer.

44. The method according to any one of paragraphs 1 to 43, wherein a concentration of the first catalyst in the first reaction mixture is about 1 wt % to about 30 wt %, based total weight of the phenolic monomer, the aldehyde monomer.

45. The method according to any one of paragraphs 1 to 44, wherein a concentration of the second catalyst in the second reaction mixture is about 1 wt % to about 30 wt %, based on the weight of the phenolic monomer.

46. The method according to any one of paragraphs 1 to 45, wherein a concentration of the second catalyst in the second reaction mixture is about 0.1 wt % to about 30 wt %, based on the total weight of the phenolic monomer, the aldehyde monomer, and the carrier fluid.

47. The method according to any one of paragraphs 1 to 46, wherein a molar ratio of the phenolic monomer to second catalyst is about 1 to about 400.

48. The method according to any one of paragraphs 1 to 47, wherein the suspension and/or emulsion has a total concentration of the phenolic monomer, aldehyde monomer, and/or prepolymer of about 1 wt % to about 90 wt %, based on the combined weight of the phenolic monomer, the aldehyde monomer, the carrier fluid, and/or the prepolymer.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A method for making polymer particles in gel form via emulsion or suspension polymerization, the method comprising:
reacting a first reaction mixture comprising a phenolic monomer, an aldehyde monomer, and a first catalyst to produce a prepolymer;
combining the prepolymer with a carrier fluid and a second catalyst to produce a second reaction mixture, wherein the second catalyst comprises a dicarboxylic acid, an anhydride, a dihydroxybenzene, or any mixture thereof; and
polymerizing the prepolymer to form polymer particles in gel form.

2. The method of claim 1, wherein the second catalyst comprises maleic anhydride, resorcinol, or a mixture thereof.

3. The method claim 1, wherein the phenolic monomer comprises phenol, a first dihydroxybenzene, or a mixture thereof, and wherein the second catalyst comprises maleic anhydride, a second dihydroxybenzene, or a mixture thereof.

4. The method of claim 3, wherein the polymer particles in gel form have a molar ratio of phenol to the first dihydroxybenzene of about 50:1 to about 5:1.

5. The method of claim 1, wherein the phenolic monomer comprises phenol, resorcinol, or a mixture thereof, and wherein the second catalyst comprises maleic anhydride, resorcinol, or a mixture thereof.

6. The method of claim 1, wherein about 50% or more of the polymer particles in gel form have an average cross-sectional length greater than or equal to 0.5 mm.

7. The method of claim 1, wherein the first catalyst comprises ammonia, dimethylethanolamine, ethylenediamine, triethylamine, trimethylamine, tripropylamine, diethylethanolamine, hexamethylenetetramine, lithium carbonate, or any mixture thereof.

8. The method of claim 1, wherein the carrier fluid comprises mineral oil, vegetable oil, or a mixture thereof.

9. The method of claim 1, wherein the carrier fluid has a viscosity of about 0.5 cP to about 400 cP at a temperature of 25° C.

10. The method of claim 1, wherein the aldehyde monomer comprises formaldehyde.

11. The method of claim 1, wherein the prepolymer has a molar ratio of the phenolic monomer to the aldehyde monomer of about 0.1:1 to about 1.5:1.

12. The method of claim 1, wherein the emulsion or suspension polymerization comprises less than 1 wt % of any surfactant, based on the total weight of the carrier fluid.

13. The method of claim 1, wherein the polymer particles in gel form are made via the emulsion process, and wherein the emulsion process is an inverse emulsion process.

14. A method for making polymer particles in gel form via emulsion or suspension polymerization, the method comprising:
reacting a first reaction mixture comprising a phenolic monomer and formaldehyde in the presence of a first catalyst to produce a prepolymer, wherein the phenolic monomer comprises phenol, resorcinol, or a mixture thereof;
combining a carrier fluid and a second catalyst with the prepolymer to form an emulsion or a suspension, wherein the second catalyst comprises an anhydride, a dihydroxybenzene, or a mixture thereof; and polymerizing the prepolymer in the emulsion or suspension to produce polymer particles in gel form.

15. The method of claim 14, wherein the first reaction mixture is reacted at a temperature of about 40° C. to about 200° C. to produce the prepolymer, and wherein the prepolymer is polymerized in the emulsion or suspension at a temperature of about 40° C. to about 200° C., and wherein the first catalyst comprises ammonia, dimethylethanolamine, ethylenediamine, triethylamine, trimethylamine, tripropylamine, diethylethanolamine, hexamethylenetetramine, lithium carbonate, or any mixture thereof.

16. The method of claim 14, wherein the first reaction mixture further comprises acetic acid, formic acid, nitric acid, citric acid, methane sulfonic acid, or any mixture thereof, and wherein the first reaction mixture has a pH of about 1 to about 5.

17. The method of claim 14, wherein the emulsion or suspension further comprises acetic acid, formic acid, nitric acid, citric acid, methane sulfonic acid, or any mixture thereof, and wherein the emulsion or suspension has a pH of about 1 to about 5.

18. A method for making an aerogel, comprising:
   making a prepolymer from a first reaction mixture comprising a phenolic monomer, formaldehyde, and a first catalyst, wherein the phenolic monomer comprises phenol, a first dihydroxybenzene, or a mixture thereof, and wherein the first catalyst comprises ammonia, dimethylethanolamine, ethylenediamine, triethylamine, trimethylamine, tripropylamine, diethylethanolamine, hexamethylenetetramine, lithium carbonate, or any mixture thereof;
   combining the prepolymer with a carrier fluid and a second catalyst comprising maleic anhydride, a second dihydroxybenzene, or a mixture a mixture thereof to form an emulsion or suspension;
   polymerizing the prepolymer in the emulsion or suspension to form polymer particles in gel form, wherein about 40% or more of the polymer particles in gel form have an average cross-sectional length greater than or equal to 1 mm; and
   drying the polymer particles in gel form to produce an aerogel.

19. The method of claim 18, wherein the carrier fluid comprises mineral oil, vegetable oil, or a mixture thereof, wherein the prepolymer has a molar ratio of the phenolic monomer to the aldehyde monomer of about 0.1:1 to about 1.5:1, wherein the prepolymer is polymerized in the emulsion to form the polymer particles in gel form, and wherein the emulsion is an inverse emulsion.

20. The method of claim 19, wherein the polymer particles in gel form are dried by supercritical extraction, freeze drying, air drying, or any combination thereof.

* * * * *